(12) United States Patent
Schierl et al.

(10) Patent No.: US 10,694,198 B2
(45) Date of Patent: *Jun. 23, 2020

(54) SCALABLE DATA STREAM AND NETWORK ENTITY

(71) Applicant: GE Video Compression, LLC, Albany, NY (US)

(72) Inventors: Thomas Schierl, Berlin (DE); Valeri George, Berlin (DE); Anastasia Henkel, Berlin (DE); Detlev Marpe, Berlin (DE); Karsten Grüneberg, Berlin (DE); Robert Skupin, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/025,319

(22) Filed: Jul. 2, 2018

(65) Prior Publication Data

US 2018/0309997 A1     Oct. 25, 2018

Related U.S. Application Data

(63) Continuation of application No. 14/510,264, filed on Oct. 9, 2014, now Pat. No. 10,045,017, which is a (Continued)

(51) Int. Cl.
*H04N 19/169* (2014.01)
*H04N 19/46* (2014.01)
(Continued)

(52) U.S. Cl.
CPC ........... *H04N 19/188* (2014.11); *H04N 19/13* (2014.11); *H04N 19/174* (2014.11);
(Continued)

(58) Field of Classification Search
CPC ...... H04N 19/188; H04N 19/91; H04N 19/46; H04N 19/13; H04N 19/436; H04N 19/174;
(Continued)

(56) References Cited

U.S. PATENT DOCUMENTS 5,736,947 A    4/1998 Imanaka
5,786,858 A    7/1998 Yagasaki et al.
(Continued)

FOREIGN PATENT DOCUMENTS

CN    101150719 A    3/2008
CN    101283351      10/2008
(Continued)

OTHER PUBLICATIONS

Notice of Allowance U.S. Appl. No. 14/510,264 dated Apr. 2, 2018.
(Continued)

*Primary Examiner* — Jared Walker
(74) *Attorney, Agent, or Firm* — Pillsbury Winthrop Shaw Pittman LLP

(57) ABSTRACT

The handling of scalable data streams by network entities is rendered less complex by, in the data stream, accompanying packets which actually carry data by packets of a different packet type which have a scalability axes descriptor defining the number of scalability axes and a semantic meaning thereof. In another aspect, the handling of scalable data streams by network entities is rendered more efficient by conveying level and/or profile descriptors using packets other than the data carrying packets, with profile and/or level descriptors being divided up into a first set explicitly signaling the definition of the available coding option set and/or available syntax element value range for a respective operation point, and a second set of profile and/or level descriptors which signal the definition of the available coding option set (Continued)

and/or available syntax element value range for their respective operation points by reference another profile and/or level descriptor.

30 Claims, 17 Drawing Sheets

Related U.S. Application Data continuation of application No. PCT/EP2013/057803, filed on Apr. 15, 2013.

(60) Provisional application No. 61/666,185, filed on Jun. 29, 2012, provisional application No. 61/624,098, filed on Apr. 13, 2012.

(51) Int. Cl.
| | |
|---|---|
| H04N 19/91 | (2014.01) |
| H04N 19/463 | (2014.01) |
| H04N 19/13 | (2014.01) |
| H04N 19/70 | (2014.01) |
| H04N 19/174 | (2014.01) |
| H04N 19/436 | (2014.01) |
| H04N 19/593 | (2014.01) |

(52) U.S. Cl.
CPC ........... *H04N 19/436* (2014.11); *H04N 19/46* (2014.11); *H04N 19/463* (2014.11); *H04N 19/70* (2014.11); *H04N 19/91* (2014.11); *H04N 19/593* (2014.11)

(58) Field of Classification Search
CPC .... H04N 19/463; H04N 19/70; H04N 19/593; H04N 21/234; H04N 19/503; H04N 19/98; H04N 19/61; H04N 19/172
USPC ........................................ 375/240.01–240.29
See application file for complete search history.

(56) References Cited

U.S. PATENT DOCUMENTS

| | | | |
|---|---|---|---|
| 6,025,932 A | 2/2000 | Imanaka | |
| 6,646,578 B1 | 11/2003 | Au | |
| 7,093,028 B1 | 8/2006 | Shao et al. | |
| 7,305,036 B2 | 12/2007 | MacInnis et al. | |
| 7,440,626 B2 | 10/2008 | Kong et al. | |
| 7,522,935 B2 | 4/2009 | Rey et al. | |
| 7,738,560 B2 | 6/2010 | Gordon et al. | |
| 7,782,947 B2 | 8/2010 | Jeon et al. | |
| 7,884,743 B2 | 2/2011 | Sakaguchi | |
| 8,031,778 B2 | 10/2011 | Kusakabe | |
| 8,345,767 B2 | 1/2013 | Nanbu et al. | |
| 8,548,064 B2 | 10/2013 | Kitahara et al. | |
| 8,670,486 B2 | 3/2014 | Hannuksela | |
| 8,831,095 B2 | 9/2014 | Koto et al. | |
| 8,885,731 B2 | 11/2014 | Tomo et al. | |
| 9,131,033 B2 | 9/2015 | Chen et al. | |
| 9,185,439 B2 | 11/2015 | Chen et al. | |
| 9,930,562 B2 | 3/2018 | Lumbatis | |
| 2004/0223551 A1 | 11/2004 | Hannuksela | |
| 2006/0268859 A1 | 11/2006 | Smith | |
| 2007/0022215 A1 | 1/2007 | Singer et al. | |
| 2008/0031346 A1 | 2/2008 | Segall | |
| 2008/0247459 A1 | 10/2008 | Yhu | |
| 2008/0285657 A1 | 11/2008 | Fu et al. | |
| 2008/0288441 A1 | 11/2008 | Lee et al. | |
| 2008/0292003 A1 | 11/2008 | Wang et al. | |
| 2009/0010337 A1 | 1/2009 | Wang | |
| 2009/0010338 A1 | 1/2009 | Wang | |
| 2009/0022219 A1 | 1/2009 | Goel | |
| 2009/0028247 A1 | 1/2009 | Suh et al. | |
| 2009/0037959 A1 | 2/2009 | Suh et al. | |
| 2009/0097704 A1 | 4/2009 | Savidge | |
| 2009/0119730 A1 | 5/2009 | Perman et al. | |
| 2009/0213938 A1 | 8/2009 | Lee et al. | |
| 2009/0279604 A1 | 11/2009 | Chono | |
| 2010/0091837 A1 | 4/2010 | Zhu et al. | |
| 2010/0098155 A1 | 4/2010 | Demircin et al. | |
| 2010/0135416 A1 | 6/2010 | Huang et al. | |
| 2010/0208735 A1 | 8/2010 | Wiegand | |
| 2010/0238998 A1 | 9/2010 | Nanbu et al. | |
| 2010/0246662 A1 | 9/2010 | Koto et al. | |
| 2010/0246683 A1 | 9/2010 | Webb et al. | |
| 2010/0254620 A1 | 10/2010 | Iwahashi | |
| 2010/0296428 A1 | 11/2010 | Ho | |
| 2010/0322317 A1 | 12/2010 | Yoshimatsu | |
| 2011/0032999 A1 | 2/2011 | Chen et al. | |
| 2011/0069153 A1 | 3/2011 | Nakane | |
| 2011/0116542 A1 | 5/2011 | Oger et al. | |
| 2011/0200104 A1 | 8/2011 | Korodi | |
| 2011/0228858 A1 | 9/2011 | Budagavi et al. | |
| 2011/0317769 A1 | 12/2011 | Tanaka | |
| 2012/0014429 A1 | 1/2012 | Zhao | |
| 2012/0014434 A1 | 1/2012 | Hong et al. | |
| 2012/0014454 A1 | 1/2012 | Budagavi et al. | |
| 2012/0027316 A1 | 2/2012 | Wang et al. | |
| 2012/0081241 A1 | 4/2012 | Misra | |
| 2012/0082218 A1 | 4/2012 | Misra | |
| 2012/0082232 A1 | 4/2012 | Sole Rojals et al. | |
| 2012/0082235 A1 | 4/2012 | Lou et al. | |
| 2012/0086587 A1 | 4/2012 | Sze | |
| 2012/0163457 A1 | 6/2012 | Wahadaniah | |
| 2012/0189049 A1 | 7/2012 | Coban | |
| 2013/0294506 A1 | 11/2013 | Kang et al. | |
| 2014/0161190 A1 | 6/2014 | Park et al. | |
| 2014/0205008 A1 | 7/2014 | Wu | |
| 2014/0341549 A1 | 11/2014 | Hattori | |

FOREIGN PATENT DOCUMENTS

| | | |
|---|---|---|
| CN | 101553988 | 10/2009 |
| CN | 101568037 | 10/2009 |
| CN | 101677430 | 3/2010 |
| CN | 101842988 | 9/2010 |
| CN | 101842988 A | 9/2010 |
| CN | 101889442 A | 11/2010 |
| CN | 101939994 A | 1/2011 |
| CN | 101960853 A | 1/2011 |
| CN | 101553988 A | 9/2011 |
| CN | 102474655 | 5/2012 |
| EP | 1667460 | 6/2006 |
| GB | 2360163 | 9/2001 |
| GG | 12013/161203 | 10/2013 |
| JP | 2005-347780 | 12/2005 |
| JP | 2006180521 | 7/2006 |
| JP | 2008017331 | 1/2008 |
| JP | 2009510888 | 3/2009 |
| JP | 2009177787 | 8/2009 |
| JP | 2010516085 | 5/2010 |
| JP | 2010-232720 | 10/2010 |
| JP | 2011-223358 | 11/2011 |
| JP | 2013132048 | 7/2013 |
| JP | 2013535886 | 9/2013 |
| JP | 2013535900 | 9/2013 |
| JP | 2013536623 | 9/2013 |
| RU | 2093968 | 10/1997 |
| RU | 2374786 | 11/2009 |
| RU | 2375839 | 12/2009 |
| RU | 2375839 C2 | 12/2009 |
| RU | 2384970 C1 | 3/2010 |
| TW | 488155 | 5/2002 |
| TW | 527798 | 4/2003 |
| TW | 200926654 | 6/2009 |
| WO | 1997/005747 | 2/1997 |
| WO | 2003/043345 | 5/2003 |
| WO | 2010/050157 A1 | 5/2010 |
| WO | 2011038021 | 3/2011 |
| WO | 2011/100456 A1 | 8/2011 |
| WO | 2012/009566 | 1/2012 |
| WO | 2012/033673 | 3/2012 |
| WO | 2012/045037 | 4/2012 |

(56) References Cited

FOREIGN PATENT DOCUMENTS

| WO | 2013063094 | | 5/2013 |
|---|---|---|---|
| WO | 2013063425 | A | 5/2013 |
| WO | 2013151634 | | 10/2013 |

OTHER PUBLICATIONS

Non-final Office Action U.S. Appl. No. 14/510,264 dated Aug. 15, 2017.
Official Communication issued in corresponding International Application PCT/EP2013/057803, dated Oct. 31, 2013.
T. Wiegand et al., "Overview of the H.264/AVC Video Coding Standard", IEEE Transactions on Circuits and Systems for Video Technology, Jul. 2003, pp. 1-19.
B. Bross et al. "High Efficiency Video Coding (HEVC) Text Specification Draft 6", 8th JCT-VC Meeting, ITU-T SG 16 WP3 and ISO/IEC JTC1/SC29/WG11, Document: JCTVC-H1003, Feb. 1-10, 2012, 259 pgs.
Series H: Audiovisual and Multimedia Systems, Infrastructure of Audiovisual Services—Transmission Multiplexing and Synchronization, "Information Technology—Generic Coding of Moving Pictures and Associated Audio Information: Systems", International Standard ISO/IEC 13818-1, ITU-T Recommendation H.222.0, 2012, 234 pgs.
B. Bross et al., "High Efficiency Video Coding (HEVC) Text Specification Draft 7" 9th JCT-VC Meeting, ITU-T SG16 WP3 and ISO/IEC JTC1/SC29/WG11, Document JCTVC-I1003_d6, Apr. 27-May 7, 2012, 278 pgs.
M. Alvarez-Mesa et al., "Parallel Video Decoding in the Emerging HEVC Standard", IEEE ICASSP, 2012, pp. 1545-1548.
K. Misra et al., "Entropy Slices for Parallel Entropy Coding", 3rd JCT-VC Meeting, ITU-T SG16 WP3 and ISO/IEC JTC1/SC29/WG11, Document: JCTVC-C256, Oct. 7-15, 2010, pp. 1-6.
H. Schulzrinne et al., "RTP: A Transport Protocol for Real-Time Applications" Network Working Group, Request for Comments: 3550, Obsoletes: 1889, Category: Standards Track, Jul. 2003, pp. 1-78.
T. Lee et al., "Simplification on Tiles and Slices", 8th JC-VC Meeting, ITU-T SG16 WP3 and ISO/IEC JTC1/SC29/WG11, Document: JCTVC-H0348, Feb. 1-10, 2012, pp. 1-9.
T. Schierl et al., "Dependent Slices", 9TH JCT-VC Meeting, ITU-T SG16 WP3 and ISO/IEC JTC1/SC29/WG11, Document: JCTVC-I0229, Apr. 27,-May 7, 2012, pp. 1-7.
G. Clare et al., "Wavefront Parallel Processing for HEVC Encoding and Decoding", 6th JTC-VC Meeting, ITU-T SG16 WP3 and ISO/IEC JTC1/SC29/WG11, Document: JCTVC-F274, Jul. 14-22, 2011, pp. 1-16.
Y. Wang et al., "RTP Payload Format for H.264 Video", Internet Engineering Task Force, Request for Comments: 6184, Obsoletes: 3984, Category: Standards Track, ISSN: 2070-1721, May 2011, pp. 1-101.
Wenger et al., "RTP Payload Format for Scalable Video Coding", Internet Engineering Task Force, Request for Comments: 6190, Category: Standards Track, ISSN: 2070-1721, May 2011, pp. 1-100.
Schierl, et al., "RTP Payload Format for High Efficiency Video Coding Draft-Schierl-Payload-rtp-h265-03.txt", Network Working Group, Internet Draft, Intended Status: Standards Track, Jun. 11, 2013, pp. 1-69.
R. Skupin et al., "Generic HEVC High Level Syntax for Scalability and Adaption", 9th JCT-VC Meeting, ITU-T SG16 WP3 and ISO/IEC JTC1/SC29/WG11, Document: JCTVC-I0217, Apr. 27,-May 7, 2012, pp. 1-6.
J. Kang et al., "Simple NAL Unit Header for HEVC", 8th JCT-VC Meeting, ITU-T SG16 WP3 and ISO/IEC JTC1/SC29/WG11, Document: JCTVC-H0410, Feb. 1-10, 2012, pp. 1-5.
J. Boyce et al., "High Level Syntax Hooks for Future Extensions", 8th JCT-VC Meeting, ITU-T SG16 WP3 and ISO/IEC JCT1/SC29/WG11, Document: JCTVC-H0388, Feb. 1-10, 2012, pp. 1-8.

Y. Wang et al., "On SVC Scalability Information Related SEI Messages", 23rd JCT-VC Meeting, ISO/IEC MPEG and ITU-T VCEG, (ISO/IEC JTC1/SC29/WG11 and ITU-T SG 16 Q 6), Document: JVT-W051, Apr. 21-27, 2007, pp. 1-14.
Y. Chen et al., "View Scalability Information SEI Message for MVC", 23rd JCT-VC Meeting, ISO/IEC MPEG and ITU-T VCEG, (ISO/IEC JTC1/SC29/WG11 and ITU-T SG 16 Q. 6) Document: JVT-W037, Apr. 21-27, 2007, pp. 1-10.
Y. Wang et al., "Sub-Picture Based CPB Operation", 9th JCT-VC Meeting, ITU-T SG16 WP3 and ISO/IEC JTC1/SC29/WG11, Document: JCTVC-I0588, Apr. 27,-May 7, 2012, pp. 1-2.
Y. Wang et al., "Sub-Picture-Level Low-Delay CPB Behavior", 9TH JCT-VC Meeting, ITU-T SG16 WP3 and ISO/IEC JTC1/SC29/WG11, Document: JCTVC-I0349 Apr. 27,-May 7, 2012, pp. 1-3.
B. Bross et al., "High Efficiency Video Coding (HEVC) Text Specification Draft 7" 9th JCT-VC Meeting, ITU-T SG16 WP3 and ISO/IEC JTC1/SC29/WG11 Document: JCTVC-I1003_d0, Apr. 27,-May 7, 2012, 268 pgs.
T. Schierl et al., "Slice Prefix for Sub-Picture and Slice Level HLS Signaling," 10th JCT-VC Meeting, ITU-T SG16 WP3 and ISO/IEC JTC1/SC29/WG11, Document: JCTVC-J0255, Jul. 11-20, 2012, pp. 1-12.
Office Action and Search Report dated Jan. 28, 2016, issued in parallel Russian Patent Application No. 2014145559, with English translation, 6 pgs.
Office Action dated Feb. 23, 2016, issued in parallel Japanese Patent Application No. 2015-519177, with English translation, 29 pgs.
Sakae Okubo, (Supervisor), Impress Standard Textbook Series, Modified 3rd ed. H.264/AVC Textbook, 1st ed., Jan. 1, 2009, Impress R&D, Corporation, pp. 99-107, 185-193, ISBN: 978-4-8843-2664-9, 27 pgs.
Benjamin Bross et al., "High efficiency video coding (HEVC) text specification draft 7, [online], Jun. 12, 2012, Joint Collaborative Team in Video Coding (JVT-VC) of ITU-T SG 16 WP 3 and ISO/IEC JTC1/SC29/WG11", Document: JCTVC-I1003_d4, searched on Feb. 9, 2016, Internet <URL: http://phenix.it-subparis.eu/jct/doc_end_user/documents/9_Geneva/wg11/JCTVC-I1003-v5.zip, 297 pgs.
Office Action issued in parallel Japanese Patent Application No. 2015-504979 dated Nov. 17, 2015 with English translation, 26 pgs.
G. Clare et al., "Wavefront Parallel Processing for HEVC Encoding and Decoding", [online] Jul. 16, 2011, Joint Collaborative Team on Video Coding (JCT-VC) of ITU-T SG16 WP3 and ISO/IEC JTC1/SC29/WG11, Document: JCTVC-F274 (version 2), [Searched on Nov. 16, 2015], 21 pgs.
Xun Guo et al., "Ordered Entropy Slices for Parallel Cabac", [online], May 2, 2009, ITU-Telecommunications Standardization Sector Study Group 16 Question 6, Document: VCEG-AK25 (Filename: VCEG-AK25_r1.doc) [Searched on Nov. 16, 2015], 11 pgs.
Tammy Lee et al., "Simplification on tiles and slices", [online] Feb. 1, 2011, Joint Collaborative Team on Video Coding (JCT-VC) of ITU-T SG16 WP3 and ISO/IEC JTC1/SC29/WG11, Document: JCTVC-H0348 (version 3), [Searched on Nov. 16, 2015], 15 pgs.
Mauricio Alvarez-Mesa et al., "Parallel Video Decoding in The Emerging HEVC Standard" Proceedings of 2012 IEEE Int. Conf. on Acoustics, Speech, and Signal Processing (CASSP), Mar. 30, 2012, pp. 1545-1548, ISBN:978-1-4673-0045-2; 4 pgs.
Hendry Sangoh Jeong et al., "AHG4: Harmonized Method for Signalling Entry Points of Tiles and WPP Substreams" [online], Feb. 10, 2011, Joint Collaborative Team on Video Coding (JCT-VC) of ITU-T SG16 WP3 and ISO/IEC JTC1/SC29/WG11, [Searched Nov. 16, 2015], 12 pages.
Office Action dated Apr. 4, 2016, issued in parallel Russian Application No. 2015102812, with English translation, 11 pgs.
Y.K. Wang et al., "Sub-picture-level low-delay CPB behavior" JCTVC-I0349, publ. Apr. 5, 2010 30 pgs. [found Mar. 25, 2016] Internet URL:http://phenix-it.subparis.eu/jct/doc_end_user/current_document.php?id=5607 text of the article found URL:http://phenix-it-subparis.eu/jct/doc_end_user/documents/9_Geneva/wg11/JCTVC-10349-VL.ZIP, sections "Abstract", "1.1. Video applications and end-to-end delay", "1.2 Hypothetical reference decoder: (HDR)", "1.3 Sub-picture based coded picture buffer (CPB) behavior" and "2 Proposal", 19 pgs.

(56) References Cited

OTHER PUBLICATIONS

European Search Report issued in European Application 16200327.1 dated Feb. 6, 2017.
Ye-Kui Wang et al., "AHG4: Tile Groups" 7, JCT-VC Meeting; 98, MPEG Meeting: Nov. 21, 2011-Nov. 30, 2011; Geneva (Joint Collaborative Team on Video Coding of ISO/IEC JTC1/SC29/WG11 and ITU-T SG.16); URL: HTTP://WFTP3_ITU.INT/AV-ARCH/JCTVC-SITE/, No. JCTVC-G318, Nov. 9, 2011 XP030110302.
Fuldseth (Cisco) A.:"Replacing slices with tiles for high level parallelism", JCT-VC Meeting; 95.MPEG Meeting: Jan. 20, 2011-Jan. 28, 2011: Daegu (Joint Collaborative Team on Video Coding of ISO/IEC JTC1/SC29/WG11 and ITU-T SG.16); URL:HTTP;//WFTP3.ITU.INT/AV-ARCH/JCTVC-SITE/, No. JCTVC-0227, Jan. 15, 2011 XP030008267, ISSN: 0000-0013.
Office Action issued in Korean Application 10-2016-7034316 dated Jan. 4, 2017.
Benjamin Bross et al., "High efficiency video coding (HEVC) text specification draft 6", (JCTVC-H1003_dj), JCT-VC of ITU-T SG16 WP3 and ISO/IEC JTC1/SC29/WG11, $7^{th}$ Meeting: Geneva, CH, Feb. 17, 2012.
P. Lambert et al., "11 Flexible macroblock ordering in H.264/AVC", Journal of Visual Communication and Image Representation, Academic Press, Inc., US, vol. 17, No. 2, Apr. 1, 2006, pp. 358-375, XP024905097, ISSN: 1047-3203, DOI: 10.1016/J.JVCI R 2005.05.008.
Office Action dated Feb. 24, 2017 in Taiwanese Patent Application No. 105130457.
Office Action dated Mar. 16, 2017 in European Patent Application No. 16206334.1.
M. Coban et al., "AHG4: Unification of picture partitioning schemes", 7. JCT-VC Meeting, 98, MPEG Meeting, Geneva, Nov. 2011 (Joint Collaborative Team on Video Codning of ISO/IEC JTC1/SC29/WG11 and ITU-T SG.16), URL:HTTP://WFTP3ITU.INT/AV-ARCH/J_CTVC-SITE/, No. JCTV-G315, XP030110299.
Ching Chi C. et al., "A QHD-capable parallel H.264 decoder", Supercomputing, ACM, New York, May 2011, pp. 317-326, XP058003741, DOI: 10.1145/1995896 1995945, ISBN 978-1-4503-0102-2.
C. Gordon et al., "Wavefront Parallel Processing for HEVC Encoding and Decoding", 6, JCT-VC Meeting, 97. MPEG Meeting, Torino, Jul. 2011 (Joint Collaborative Team on Video Coding of ISO/IEC JTC1/SC29/WG11 and ITU-T SG.16) HTTP://WFTP3.ITU.INT/AV-ARCH/JCTVC-SITE/, No. JCTVC-F274.
Decision to Grant dated Mar. 21, 2017 in Japanese Application 2015-504980.
Sakai Okubo, "Impress Standard Textbook Series, revision $3^{rd}$ ed. H264/AVC Textbook", Japan Impress R&D Co., Ltd. Jan. 1, 2009, $1^{st}$ ed. pp. 315-319, ISBN:978-4-8443-2664-9.
R. Sjoberg et al, "NAL unit header concept with support for bit stream scalability" [online] Joint Collaborative Team on Video Coding (JCT-VC) of ITU-T SG16 WP3 and ISO/IEC JTC1/SC29/WG11, Mar. 19, 2011, Document: JCTVC-E422, [Searched on Oct. 2, 2013], Internet URL:HTTP://PHENIX.IT-SUDPARIS.EU/JCT/DOC_END_USER/DOCUMENTS/5_GENEVA/WG11/JCTVC-E422-V2.ZIP.
"H-264 (Jan. 2012)", [online], ITU-T, Jan. 13, 2012, pp. 605, 606, 630-632, 646-649 [Searched on Aug. 12, 2-15], URL:https://www.itu.int/rec/dologin_pub.asp?lang=e&id=T-REC-H.264-201201-S!!PDF-E&type=items.
R. Sjoberg et al., "High-Level Syntax for Bitstream Extraction", [online], Joint Collaborative Team on Video Coding (JCT-VC) of ITU-TSG16 WP3 and ISO/IEC JTC1/SC29/WG11, Nov. 26, 2011, Document: JCTVC-G607, [Searched on Nov. 8, 2013], Internet URL:http://phenix.it-subparis.eu/jct/doc_end_user/documents/7_Geneva/wg11/JCTVC-G607-v2.zip.
J. Boyce et al., "Information for scalable Extension highly layer syntax", [online], Joint Collaborative Team on Video Coding (JCT-VC) of ITU-T SG16 WP3 and ISO/IEC JTC1/SC29/WG11, Jan. 25, 2012, Document: JCTVC-H03896, [Searched on Dec. 20, 2013] Internet <URL: http://phenix.it-subparis.eu/jct/doc_end_user/documents/8_san%20Jose/wg11/JCTVC-H0386-v3.zip.
Office Action dated Mar. 24, 2017 in Chinese Application No. 201380031293.3.
Office Action dated Apr. 1, 2017 in Chinese Application No. 201380034944.4.
Office Action May 3, 2017 in Chinese Application No. 201380031308.6.
Office Action dated Jun. 22, 2017 in Australian Application 2016204304.
Schwarz et al., "Overview of the Scalable Video Coding Extension of the H.264/AVC Standard", IEEE Transactions on Circuits and Systems for Video Technology, vol. 17, No. 9, Sep. 2007.
Office Action dated May 26, 2017 U.S. Appl. No. 14/511,200.
Office Action dated Jun. 20, 2017 in Japanese Patent Application No. 2016-160844.
T. Schierl et al., Dependent slices support in HEVC main profile, Joint Collaborative Team on Video Coding (JCT-VC) of ITU-T SG16 WP3 and ISO/IEC JTC1/SC29/WG11, $10^{th}$ Meeting: Stockholm, SE, Jul. 11, Jul. 20, 2012, Jul. 2, 2012, JCTVC-J0264, URL: http://phenix-it-subparis.eu/jct/doc_end_user/documents/10-Stockholm/wg11/jctvc-j0264-v1.zip.
Chih-Wei Hsu et al., AHG4: Wavefront tile parallel Team on Video Coding (JCT-VC) of ITU-T SG16 WP3 and ISO/IEC JTC1/SC29/WG11, $7^{th}$ Meeting: Geneva, CH, Nov. 21-30, 2011, Nov. 27, 2011, JCTVC-G199 URL: http://phenix-it-sudparis.eu/jct/doc_end_user/documents/7-Geneva/wg11/JCTVC-G199-v6.zip.
Decision to Grant dated Sep. 11, 2017 in Korean Application No. 10-2016-7034316.
Kiran Misra et al., "Entropy slices for parallel entropy coding", JCT-VC of ITU-T SG16 WP3 and ISO/IEC JTC1/SC29/WG11, $2^{nd}$ Meeting: Geneva CH Jul. 21-28, 2010, Document: JCTVC-B111.
Office Action dated Jan. 8, 2018 in U.S. Appl. No. 14/511,200.
Search Report dated Nov. 30, 2017 in Taiwanese Application 116111143.
Office Action dated Dec. 12, 2017 in Japanese Application 2017-019898.
MenHuang Lee et al., "ROI Slice SEI message", Joint Video Team (JVT) of ISO/IEC MPEG & ITU-T VCED (ISO/IEC TCT1/SC29/WG11 and ITU-T SG16 Q.6), $18^{th}$ Meeting: Bangkok, Thailand, Jan. 2006, JVT-R024, pp. 1-8.
MenHuang Lee et al., "ROI Slice SEI message", Joint Video Team (JVT) of ISO/IEC MPEG & ITU-T VCED (ISO/IEC JTC1/SC29/WG11 and ITU-T SG16 Q.6), $19^{th}$ Meeting: Geneva, Switzerland, Apr. 2006, JVT-S054r1, pp. 1-13.
Ye-Kui Wang et al., "Tile groups", Joint Collaborative Team on Video Coding (JCT-VC) of ITU-T SG16 WP3 and ISO/IEC JTC1/SC29/WG11, $8^{th}$ Meeting: San Jose, CA, USA Jan. 2012, JCTVC-H0520r1, pp. 1-8.
R. Skupin et al., "Tile-based region-of-interest signaling with sub-picture SEI messages" Joint Collaborative Team on Video Coding (JCT-VC) of ITU-T SG16 WP3 and ISO/IEC JTC1/SC29/WG11, $11^{th}$ Meeting: Shanghai, CN, Oct. 2012, JCTVC-K0218, pp. 1-3.
Office Action dated Dec. 26, 2017 in Japanese Application No. 2017-019896.
Yoshihisa Yamada et al., "Standardization trend of High-quality Video Coding Technics", Mitsubishi Electric Technical Report, Japan, Mitsubishi Electric Engineering Company Limited, Dec. 25, 2008, vol. 82, No. 12, pp. 7-10.
Office Action dated Dec. 1, 2017 in Taiwanese Application No. 106110824.
Examination Report issued in corresponding Canadian Patent Application No. 2,877,045 dated Apr. 23, 2018.
Muhammed Coban et al., "On Entropy Slices", Joint Collaborative Team on Video Coding (JCT-VC) of ITU-T SG16 WP3 and ISO/IEC JTC1/SC29/WG11, $8^{th}$ Meeting: San Jose, CA, USA Jan. 2012, JCTVC-H0515r2, pp. 1-7.
Felix Henry et al, "Wavefront Parallel Processing" , Joint Collaborative Team on Video Coding (JCT-VC) of ITU-T SG16 WPO3 and ISO/IEC JTC1/SC29/WG11, $5^{th}$ Meeting: Geneva, CH, Mar. 2011, JCTVC-E196, pp. 1-9.
Gordon Clare et al., "Wavefront and Cabac Flush: Different Degrees of Parallelism Without Transcoding", Joint Collaborative Team on

(56) References Cited

OTHER PUBLICATIONS

Video Coding (JCT-VC) of ITU-T SG16 WP3 and ISO/IEC JTC1/SC29/WG11, 6th Meeting: Torino, IT, Jul. 2011, JCTVC-F275, pp. 1-11.
Kiran Misra et al., "Harmonization of Entry Points for Tiles and Wavefront Processing", Joint Collaborative Team on Video Coding (JCT-VC) of ITU-T SG16 WP3 and ISO/IEC JTC1/SC29/WG11, 7th Meeting: Geneva, CH, Nov. 2011, JCTVC-G722-r1, pp. 1-4.
Notification of Reasons for Refusal Japanese Patent Application No. 2016-160844 dated Apr. 24, 2018 with English translation.
Non-final Office Action U.S. Appl. No. 15/928,742 dated Jul. 15, 2018.
Notice of Allowance U.S. Appl. No. 14/511,200 dated Jun. 22, 2018.
Office Action Russian Patent Application No. 2016141337/08(066168) dated Aug. 16, 2018 with English translation.
Notification of Reasons for Refusal Japanese Patent Application No. 2017-019896 dated Jul. 17, 2018 with English translation.
Kimihiko Kazui et al., AHG9: Improvement of HRD for sub-picture based operation, Joint Collaborative Team on Video Coding (JCT-VC) of ITU-T SG16 WP3 and ISO/IEC JTC 1/SC/29/EG11, 10th Meeting: Stockholm, SE, Jul. 2012, JCTVC-J0136, pp. 1-10.
Notification of Reasons for Refusal dated Feb. 20, 2019 issued in corresponding Japanese Patent Application No. 2017-019896 with English translation.
Notice of Allowance dated Mar. 29, 2019 issued in corresponding Taiwanese Patent Application No. 107128325 with English translation.
Notice of Acceptance of Application dated Jan. 7, 2019 issued in corresponding Australian Patent Application No. 2016259446.
Office Action dated Dec. 26, 2018 issued in corresponding India Patent Application No. 2390/KOLNP/2014 with English translation.
Non-final Office Action U.S. Appl. No. 16/153,307 dated Dec. 11, 2018.
Jie Zhao et al., "Parallel entropy decoding for high resolution video coding", Visual Communications and Image Processing, SPIE vol. 7257, 2009, 725706-1-725706-11.
Notice of Allowance U.S. Appl. No. 15/928,742 dated Jan. 24, 2019.
Office Action Israeli Patent Application No. 261382 dated May 26, 2019 with English translation.
Decision to Grant Japanese Patent Application No. 2016-160844 dated Jun. 18, 2019 with English translation.
Notice of Allowance U.S. Appl. No. 16/153,307 dated Apr. 24, 2019.
Extended European Search Report dated Feb. 27, 2019 issued in corresponding EP Application No. 18211768.9.
Notification of Reasons for Refusal Japanese Patent Application No. 2016-160844 dated Nov. 20, 2018 with English translation.
Notification to Grant Chinese Patent Application No. 201380031293.3 dated Jul. 3, 2019 with English translation.
Notice of Allowance Philippines Patent Application No. 1/2017/501901 dated Jul. 3, 2019.
Notice of Allowance Philippines Patent Application No. 1/2017/501900 dated Jul. 3, 2019.
Office Action Korean Patent Application No. 10-2019-7014099 dated Jul. 3, 2019 with English translation.
Office Action Korean Patent Application No. 10-2019-7014098 dated Jul. 3, 2019 with English translation.
Office Action Korean Patent Application No. 10-2019-7014097 dated Jul. 3, 2019 with English translation.
Office Action India Patent Application No. 3035/KOLNP/2014 dated Jul. 16, 2019 with English translation.
Sullivan et al., "Meeting Report of the ninth meeting of the Joint Collaborative Team on Video Coding (JCT-VC)", Joint Collaborative Team on Video Coding (JCT-VC) of ITU-T SG16 WP3 and JTC1/SC29/WG11 9th Meeting: Geneva, CH, Apr. 27,-May 7, 2012, pp. 1-239.
Office Action Taiwanese Patent Application No. 107125227 dated Jun. 28, 2019 with English translation.
Notice of Allowance dated Dec. 10, 2019 in U.S. Appl. No. 16/153,307.
Notice of Allowance dated Dec. 12, 2019 in U.S. Appl. No. 16/514,052.
Notice of Allowance dated Jul. 29, 2019 in Philippine Application 12017501899.
Office Action dated Aug. 22, 2019 in Israeli Application 268801.
Decision to Grant dated Sep. 10, 2019 in Japanese Application 2017-019896.
Office Action dated Sep. 10, 2019 in Korean Application 10-2018-7002787.
Office Action dated Sep. 11, 2019 in Australian Application 2018236689.
ITU-T H.222.0, Series H: Audiovisual and Multimedia Systems, Infrastructure of Audiovisual Services-Coding of Moving Video, Advanced Video Coding for Generic Audiovisual Services, Mar. 2005.
Schierl, T. et al., "Dependent Slices," Joint Collaborative Team on Video Coding (JCT-VC) of ITU-T SG 16 WP 3 and ISO/IEC JTC 1/SC 29/WG 11, 9th Meeting: Geneva, CH, Apr. 27,-May 7, 2012.
Office Action dated Aug. 14, 2019 in U.S. Appl. No. 16/514,052.
Office Action dated Oct. 15, 2019 in Russian Patent Application 2016141337.
Decision to Grant dated Nov. 15, 2019 in Korean Application 10-2019-7014097.
Decision to Grant dated Nov. 15, 2019 in Korean Application 10-2019-7014098.
Office Action dated Nov. 26, 2019 in Mexican Application MX/a/2017/009967.
Office Action dated Nov. 25, 2019 in Philippine Application 1-2019-501219.
Office Action dated Dec. 10, 2019 in Australian Application 2019202551.
Office Action dated Apr. 21, 2020 in U.S. Appl. No. 16/819,652.
Office Action dated Feb. 25, 2020 in Chinese Application 201810340437.8.
Decision to Grant dated Feb. 28, 2020 in Russian Application 2017137234.
Office Action dated Mar. 24, 2020 in Chinese Application 201810340438.2.
Office Action dated Mar. 24, 2020 in Chinese Application 201810340459.4.
Office Action dated Apr. 8, 2020 in Chinese Application 201810340463.0.
Office Action dated Apr. 8, 2020 in Korean Application 10-2020-7004531.

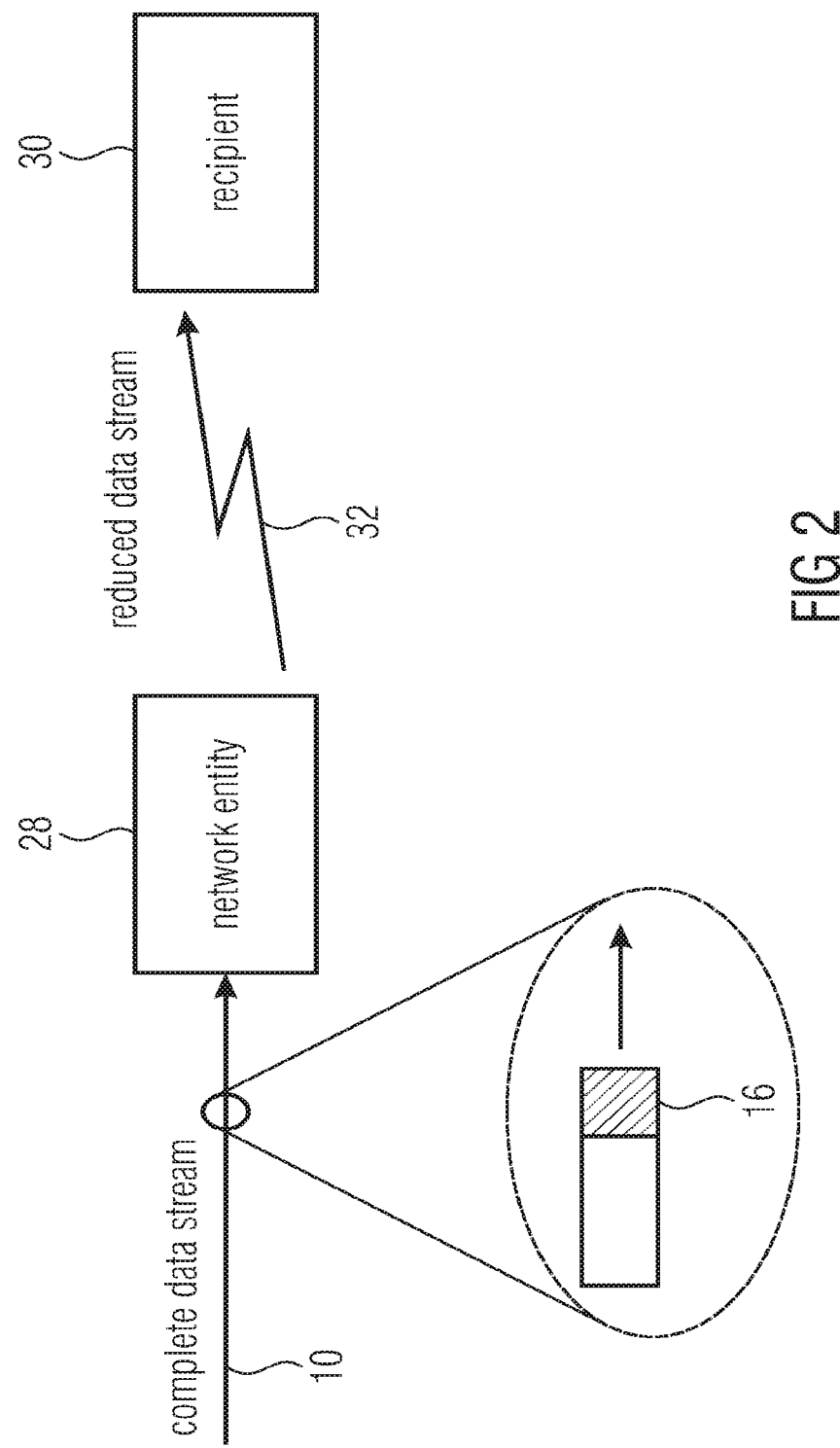

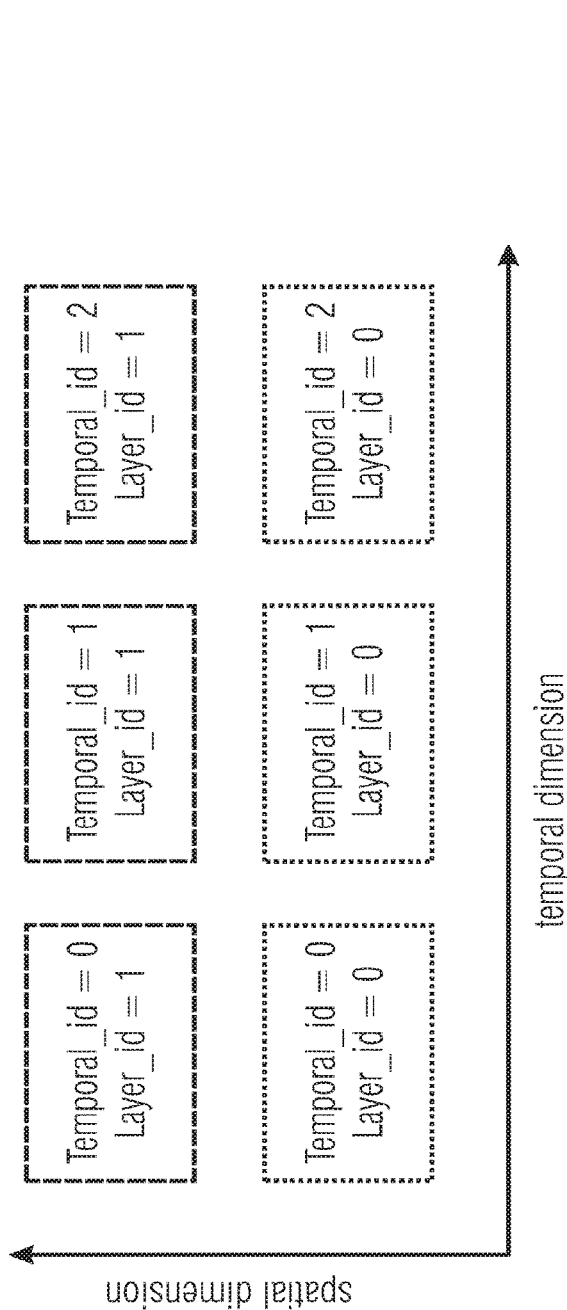
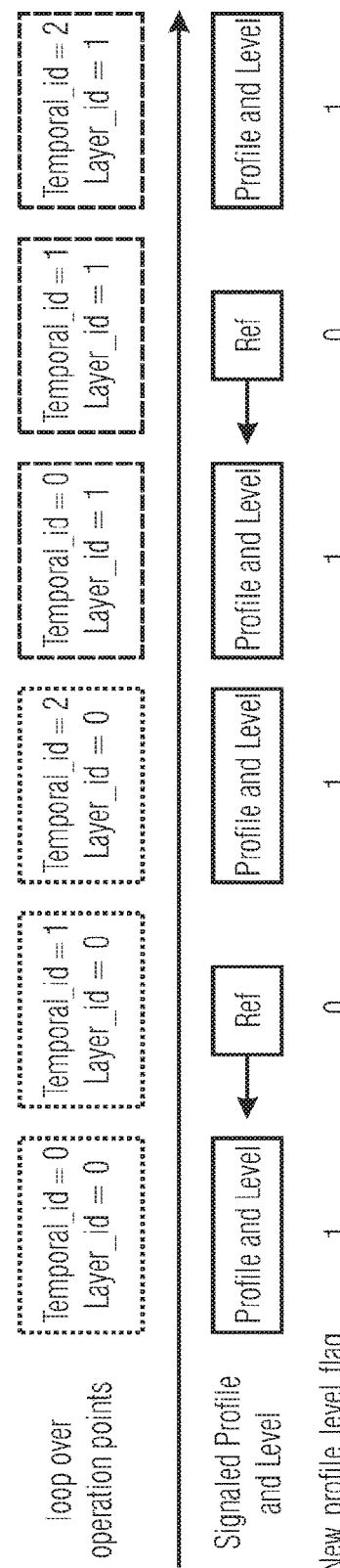
FIG 3A
FIG 3B

| | Descriptor |
|---|---|
| nal_unit( NumBytesInNALunit ) { | |
|   forbidden_zero_bit | f(1) |
|   nal_ref_flag    —16 | u(1) |
|   nal_unit_type | u(6) |
|   NumBytesInRBSP = 0    —64 | |
|   layer_scenario    —60 | u(2) |
|   layer_id | u(6) |
|   for( i = nalUnitHeaderBytes; i < NumBytesInNALunit; i++ ) { | |
|     if( i + 2 < NumBytesInNALunit && next_bits( 24 ) = = 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

| video_parameter_set_rbsp( ) { | Descriptor |
|---|---|
|   video_parameter_set_id | u(8) |
|   profile_idc | u(8) |
|   reserved_zero_8bits /* equal to 0 */ | u(8) |
|   level_idc | u(8) |
|   layer_id_type | u(7) |
|   vps_extension_flag | u(1) |
|   if( vps_extension_flag ) | |
|     while( more_rbsp_data( ) ) | |
|       vps_extension_data() | u(1) |
|   rbsp_trailing_bits( ) | |
| } | |

| vps_extension_data() { | Descriptor |
|---|---|
|    layer_id — 56 | u(6) |
|    new_profile_level_flag — 46 | u(1) |
|    reserved_zero_1_bit | u(1) |
|    if ( new_profile_level_flag == 1 ) { | |
|      profile_idc — 48 | u(8) |
|      reserved_zero_8bits /* equal to 0 */ | u(8) |
|      level_idc | u(8) |
|    } else { — 50 | |
|      ref_layer_id | u(6) |
|      reserved_zero_2_bits — 52 | u(2) |
|    } | |
| } | |

FIG 6

| | Descriptor |
|---|---|
| nal_unit( NumBytesInNALunit ) { | |
|   forbidden_zero_bit | f(1) |
|   nal_ref_flag —— 16 | u(1) |
|   nal_unit_type | u(6) |
|   NumBytesInRBSP = 0 | |
|   temporal_id —— 90 | u(3) |
|   reserved_one_5bits —— 34 | u(5) |
|   layer_id_plus1 —— 92 | u(5) |
|   for( i = naiUnitHeaderBytes; i < NumBytesInNALunit; i++ ) { | |
|     if( i + 2 < NumBytesInNALunit && next_bits(24) == 0x000003 ) { | |
|       rbsp_byte[ NumBytesInRBSP++ ] | b(8) |
|       rbsp_byte[ NumBytesInRBSP++ ] | b(8) |
|       i += 2 | |
|       emulation_prevention_three_byte /* equal to 0x03 */ | f(8) |
|     } else | |
|       rbsp_byte[ NumBytesInRBSP++ ] | b(8) |
|   } | |
| } | |

FIG 11

| seq_parameter_set_rbsp( ) { | Descriptor |
|---|---|
| ~~profile_space~~ | ~~u(3)~~ |
| ~~profile_idc~~ | ~~u(5)~~ |
| ~~constraint_flags~~ | ~~u(16)~~ |
| ~~level_idc~~ | ~~u(8)~~ |
| ~~for( i = 0; i < 32; i++ )~~ | |
| ~~profile_compatability_flag[ i ]~~ | ~~u(1)~~ |
| seq_parameter_set_id | ue(v) |
| video_parameter_set_id | ue(v) |
| chroma_format_idc | ue(v) |
| if( chroma_format_idc == 3 ) | |
| separate_colour_plane_flag | u(1) |
| ~~sps_max_temporal_layers_minus1~~ | ~~u(3)~~ |
| pic_width_in_luma_samples | ue(v) |
| pic_height_in_luma_samples | ue(v) |
| pic_cropping_flag | u(1) |
| if( pic_cropping_flag ) { | |
| pic_crop_left_offset | ue(v) |
| pic_crop_right_offset | ue(v) |
| pic_crop_top_offset | ue(v) |
| pic_crop_bottom_offset | ue(v) |
| } | |
| bit_depth_luma_minus8 | ue(v) |
| bit_depth_chroma_minus8 | ue(v) |
| | |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |

FIG 12A

| FIG 12 | FIG 12A |
|---|---|
| | FIG 12B |
| | FIG 12C |

| | |
|---|---|
| } | |
| log2_max_pic_order_cnt_lsb_minus4 | ue(v) |
| for( i = 0; i <= sps_max_temporal_layers_minus1; i++ ) { | |
|     sps_max_dec_pic_buffering[ i ] | ue(v) |
|     sps_num_reorder_pics[ i ] | ue(v) |
|     sps_max_latency_increase[ i ] | ue(v) |
| } | |
| restricted_ref_pic_lists_flag | u(1) |
| if( restricted_ref_pic_lists_flag ) | |
|     lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|     log2_min_pcm_coding_block_size_minus3 | ue(v) |
|     log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | u(1) |
| if( scaling_list_enable_flag ) { | |
|     sps_scaling_list_data_present_flag | u(1) |
|     if( sps_scaling_list_data_present_flag ) | |
|         scaling_list_param( ) | |
| } | |
| chroma_pred_from_luma_enabled_flag | u(1) |
| transform_skip_enabled_flag | u(1) |
| seq_loop_filter_across_slices_enabled_flag | u(1) |

FIG 12B

| FIG 12 | FIG 12A |
|---|---|
| | FIG 12B |
| | FIG 12C |

| | |
|---|---|
| asymmetric_motion_partitions_enabled_flag | u(1) |
| nsrqt_enabled_flag | u(1) |
| sample_adaptive_offset_enabled_flag | u(1) |
| adaptive_loop_filter_enabled_flag | u(1) |
| if( adaptive_loop_filter_enabled_flag ) | |
|     alf_coef_in_slice_flag | u(1) |
| if( pcm_enabled_flag ) | |
|     pcm_loop_filter_disable_flag | u(1) |
| ~~sps_temporal_id_nesting_flag~~ | ~~u(1)~~ |
| | |
| if( log2_min_coding_block_size_minus3 == 0 ) | |
|     inter_4x4_enabled_flag | u(1) |
| num_short_term_ref_pic_sets | ue(v) |
| for( i = 0; i < num_short_term_ref_pic_sets; i++ ) | |
|     short_term_ref_pic_set( i ) | |
| long_term_ref_pics_present_flag | u(1) |
| sps_temporal_mvp_enable_flag | u(1) |
| vui_parameters_present_flag | u(1) |
| if( vui_parameters_present_flag ) | |
|     vui_parameters( ) | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

FIG 12C

| FIG 12 | FIG 12A |
|---|---|
| | FIG 12B |
| | FIG 12C |

| video_parameter_set_rbsp( ) {                                              | Descriptor |
|----------------------------------------------------------------------------|------------|
|   video_parameter_set_id                                         | u(8)       |
|   scalability_type                                               | u(4)       |
|   ~~vps_~~temporal_id_nesting_flag                               | u(1)       |
|   ~~vps_~~max_temporal_layers_minus1                             | u(3)       |
|   profile_space                                                  | u(3)       |
|   profile_idc                                                    | u(5)       |
|   constraint_flags                                               | u(16)      |
|   for( i = 0; i < 32; i++ )                                      |            |
|     profile_compatability_flag[ i ]                    | u(1)       |
|   for( i = 0; i < vps_max_temporal_layers_minus1; i++ ) {        |            |
|     level_idc[ i ]                                     | u(8)       |
|     ~~vps_max_dec_pic_buffering[ i ]~~                 | ~~ue(v)~~  |
|     ~~vps_num_reorder_pics[ i ]~~                      | ~~ue(v)~~  |
|     ~~vps_max_latency_increase[ i ]~~                  | ~~ue(v)~~  |
|   }                                                              |            |
|   for( n = 0; i < max_dim (scalability_type ); n++ ) {           |            |
|     layer_id_plus1_dim_len[ n ]                        | u(3)       |
|   }                                                              |            |
|   vps_extension_flag                                             | u(1)       |
|   if( vps_extension_flag )                                       |            |
|     while( more_rbsp_data( ) )                         |            |
|       vps_extension_data()                   | u(1)       |
|   rbsp_trailing_bits( )                                          |            |
| }                                                                          |            |

| | Descriptor |
|---|---|
| vps_extension_data() { | |
|   vps_extension_type  ← 56 | u(2) |
|   layer_id_plus1 | u(5) |
|   max_temporal_layers_minus1  ← 46 | u(3) |
|   new_profile_level_flag | u(1) |
|   if ( new_profile_level_flag == 0 ) {  ← 52 | |
|     profile_reference_layer_id_plus1 | u(5) |
|   } | |
|   else { | |
|     profile_space | u(3) |
|     profile_idc | u(5) |
|     constraint_flags  ← 48 | u(16) |
|     for( i = 0; i < 32; i++ ) | |
|       profile_compatability_flag[ i ] | u(1) |
|     for( i = 0; i < max_layer_tmp_level; i++ ) | |
|       level_idc[ i ]  ← 50 | u(8) |
|   } | |
|   num_reference_layers | u(5) |
|   for( n = 0; n < num_reference_layers; n++ )  } 98 | |
|     direct_coding_dependency_layer_id_plus1[ n ] | u(5) |
| } | |

FIG 14

SCALABLE DATA STREAM AND NETWORK ENTITY

CROSS-REFERENCE TO RELATED APPLICATIONS

This application is a continuation of U.S. Ser. No. 14/510,264, filed Oct. 9, 2014, which is a continuation of International Application No. PCT/EP2013/057803, filed Apr. 15, 2013, and additionally claims priority from US Applications Nos. 61/624,098, filed Apr. 13, 2012, and 61/666,185, filed Jun. 29, 2012. Each of these applications is incorporated herein by reference in its entirety.

BACKGROUND OF THE INVENTION

The present invention is concerned with scalable data streams such as scalable video streams and network entities dealing with such scalable data streams such as, for example, a decoder or MANE (media-aware network element).

From a transport perspective, adaptation of video bitstreams in temporal or other dimensions is highly desirable, as was already identified and addressed within the standardization of H.264/AVC. The encapsulation of video data into Network Abstraction Layer (NAL) units and the design decision to signal many important but rather invariant parameters outside the video bitstream in so called Parameter Sets reflect this understanding. The Scalable Video Coding (SVC) and Multiview Video Coding (MVC) extensions of H.264/AVC allow for adaptation beyond the temporal dimension but a lack of extensibility in the base specification of H.264/AVC led to complicated approaches to extend the H.264/AVC high level syntax in a backward compatible way. In H.264/AVC and its extensions the signaling of operation points along the scalability dimensions is done by means of NAL units header extensions that include an extra byte for this purpose. The same information is provided by the so-called prefix NAL units for NAL units that contain pure H.264/AVC video data and constitute the so-called base layer. A mechanism to extend the information provided via Sequence Parameter Set (SPS) of the base layer for the enhanced layers, coded by the extensions of H.264/AVC, is established via so-called Subset Sequence Parameter Sets (SSPS).

While the development of the HEVC base specification is still ongoing, efforts towards a 3D video coding extension are already taken in order to assure an extensible syntax in the base specification in the beginning. These so-called scalable hooks in the base specification need to be designed carefully to be future-proof. The following paragraphs give an overview on the current status of the HEVC High Level (HL) syntax and the concepts that are under discussion at the moment.

The current status of the HEVC standardization is as follows:

During the ongoing HEVC base specification and the 3D extensions, numerous participants made proposals on how to proceed from the HL syntax as specified in H.264/AVC. The outcome is reflected in the current working draft of the specification and the numerous contributions of the individual participants. The following paragraphs give an overview on the current discussion.

As stated above, the signalization of operation points within the scalability dimensions of an SVC or MVC video bitstream necessitates (specific) extensions of the H.264/AVC NAL unit headers. This is regarded as an unclean solution, causing extra effort e.g. for parsing multiple different NAL unit header structures and necessitating prefix NAL units to signal the base layer. Therefore, an effort was made to ensure that the base HEVC NAL unit header syntax is versatile enough to satisfy the needs of the future extensions of the base specification.

In the syntax of a NAL unit as in the current working draft, a current consensus was to use a two byte NAL unit header. In the first byte, nal_ref_flag is signaled with on bit opposed to the two bits of nal_ref_idc in H.264/AVC, as this HL feature has not been widely used in applications. The syntax element nal_unit_type therefore has one more bit to signal the type of the NAL unit, which allows for a total of 64 distinguishable types.

The second byte of the NAL unit header is divided into two parts, where 1c bits are used to signal temporal_id of the NAL unit as temporal scalability is already enabled in the base specification. The remaining 5 bits of the second byte are reserved to be equal to one within a HEVC conforming bitstream. The current understanding of the usage of the remaining 5 bits is that they can be used to signal scalability identifiers in future extensions, e.g. for a layer_id syntax element.

While Picture Parameter Set (PPS) and Sequence Parameter Set as defined in the current HEVC base specification are relatively similar to what has formerly been specified in H.264/AVC, two new Parameter Sets, referred to as the Adaptation Parameter Set (APS) and Video Parameter Set (VPS), have been introduced to HEVC of which only the VPS is relevant for the content of this document.

The Video Parameter Set was supposed to signal parameters such as the number of (e.g. temporal) level/layer present in the video bitstream and the profile and level for all operation points within. Other parameters to be signaled include the dependencies between scalable layers, much as it is signaled in the SVC scalability information SEI messages.

An additional brief explanation is presented below with regard to the semantics of the NAL unit and Video Parameter Set syntax.

profile_idc and level_idc indicate the profile and level to which the coded video sequence conforms.

max_temporal_layers_minus1+1 specifies the maximum number of temporal layers present in the sequence. The value of max_temporal_layers_minus1 shall be in the range of 0 to 7, inclusive.

more_rbsp_data( ) is specified as follows.

If there is no more data in the RBSP, the return value of more_rbsp_data( ) is equal to FALSE.

Otherwise, the RBSP data is searched for the last (least significant, right-most) bit equal to 1 that is present in the RBSP. Given the position of this bit, which is the first bit (rbsp_stop_one_bit) of the rbsp_trailing_bits( ) syntax structure, the following applies.

If there is more data in an RBSP before the rbsp_trailing_bits( ) syntax structure, the return value of more_rbsp_data( ) is equal to TRUE.

Otherwise, the return value of more_rbsp_data( ) is equal to FALSE.

nal_ref_flag equal to 1 specifies that the content of the NAL unit contains a sequence parameter set, a picture parameter set, an adaptation parameter set or a slice of a reference picture.

For coded video sequences conforming to one or more of the profiles specified in Annex 10 that are decoded using the decoding process specified in clauses 2-9, nal_ref_flag equal to 0 for a NAL unit containing a slice indicates that the slice is part of a non-reference picture.

nal_ref_flag shall be equal to 1 for sequence parameter set, picture parameter set or adaptation parameter set NAL units. When nal_ref_flag is equal to 0 for one NAL unit with nal_unit_type equal to 1 or 4 of a particular picture, it shall be equal to 0 for all NAL units with nal_unit_type equal to 1 or 4 of the picture.

nal_ref_flag shall be equal to 1 for NAL units with nal_unit_type equal to 5.

nal_ref_flag shall be equal to 0 for all NAL units having nal_unit_type equal to 6, 9, 10, 11, or 12.

nal_unit_type specifies the type of RBSP data structure contained in the NAL unit as specified in Table 1.

Decoders shall ignore (remove from the bitstream and discard) the contents of all NAL units that use reserved values of nal_unit_type.

TABLE 1 possible (not exhaustive list of) NAL unit type codes and NAL unit type classes

| nal_unit_type | Content of NAL unit and RBSP syntax structure | NAL unit type class |
|---|---|---|
| 0 | Unspecified | non-VCL |
| 1 | Coded slice of non-IDR, non-CRA and non-TLA picture slice_layer_rbsp( ) | VCL |
| 2 | Reserved | n/a |
| 3 | Coded slice of TLA picture slice_layer_rbsp( ) | VCL |
| 4 | Coded slice of a CRA picture slice_layer_rbsp( ) | VCL |
| 5 | Coded slice of an IDR picture slice_layer_rbsp( ) | VCL |
| 6 | Supplemental enhancement information (SEI) sei_rbsp( ) | non-VCL |
| 7 | Sequence parameter set seq_parameter_set_rbsp( ) | non-VCL |
| 8 | Picture parameter set pic_parameter_set_rbsp( ) | non-VCL |
| 9 | Access unit delimiter access_unit_delimiter_rbsp( ) | non-VCL |
| 10-11 | Reserved | n/a |
| 12 | Filler data filler data rbsp( ) | non-VCL |
| 13 | Reserved | n/a |
| 14 | Adaption parameter set aps rbsp( ) | non-VCL |
| 15-23 | Reserved | n/a |
| 24 . . . 63 | I Unspecified | non-VCL |

A "profile" is a subset of the entire bitstream syntax. Within the bounds imposed by the syntax of a given profile it is still possible to necessitate a very large variation in the performance of encoders and decoders depending upon the values taken by syntax elements in the bitstream such as the specified size of the decoded pictures. In many applications, it is currently neither practical nor economic to implement a decoder capable of dealing with all hypothetical uses of the syntax within a particular profile.

In order to deal with this problem, "levels" are specified within each profile. A level is a specified set of constraints imposed on values of the syntax elements in the bitstream. These constraints may be simple limits on values. Alternatively they may take the form of constraints on arithmetic combinations of values (e.g., picture width multiplied by picture height multiplied by number of pictures decoded per second).

level: A defined set of constraints on the values that may be taken by the syntax elements and variables. The same set of levels is defined for all profiles, with most aspects of the definition of each level being in common across different profiles. Individual implementations may, within specified constraints, support a different level for each supported profile. In a different context, level is the value of a transform coefficient prior to scaling.

profile: A specified subset of the syntax.

In the development of the 3D video coding extension for HEVC, there has also been the proposal to shift certain parameters from the slice header to the Access Unit Delimiter (AUD), a NAL unit that optionally stands in the beginning of a new Access Unit (AU) m H.264/AVC.

Another proposal during the course of the specification of the HEVC 3D video coding extension is to signal the dependencies between operation points by means of indirection between SPSs. The NAL unit header is supposed to carry a reference to a SPS and within each SPS is a reference to the relative base SPS. This (potentially cascaded) indirection has to be resolved until the SPS for the lowest (temporal, . . . ) level. Such an approach puts a high burden on devices such as a MANE to look deep into the bitstream and hold a substantial amount of information available for the purpose of identifying operation points.

In any case, it would still be favorable to have a solution at hand which facilitates, or renders more efficient, the handling of scalable data streams by network entities.

SUMMARY

An embodiment may have a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein each packet having a predetermined packet type disjoint to the second set associated therewith, has an scalability axes descriptor defining the number n and a semantic meaning of the one or more scalability axes.

Another embodiment may have a data stream into which a media content is coded, the data stream including packets, each packet including a packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to the second set associated therewith, includes a sequence of profile and/or level descriptors each associated with one or more of at least a subset of the plurality of operation points, each profile and/or level descriptor defining an available coding option set and/or an available syntax element value range which a sequence of packets having an operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another profile and/or level descriptor.

Another embodiment may have a network entity for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configured to read from a packet having a predetermined packet type disjoint to the second set associated therewith, a scalability axes descriptor defining the number n and a semantic meaning of the one or more scalability axes, and interpret the operation point identifiers depending on the scalability axes descriptor.

Another embodiment may have a network entity for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configured to read from a packet having a predetermined packet type disjoint to the second set associated therewith, a sequence of profile and/or level descriptors each associated with one or more of at least a subset of the plurality of operation points, each profile and/or level descriptor defining an available coding option set and/or an available syntax element value range which a syntax of packets having an operation point associated with the respective profile and/or level descriptor, associated therewith, obey, wherein the network entity is configure to, responsive to a signaling in the data stream, explicitly read from a first set of the profile and/or level descriptors the definition of the available coding option set and/or available syntax element value range, and read, for a second, disjoint non-empty set of the profile and/or level descriptors, a reference to another profile and/or level descriptor and derive the definition of the available coding option set and/or available syntax element value range of the second, disjoint non-empty set of the profile and/or level descriptors from the respective referenced profile and/or level descriptor.

According to another embodiment, a method for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, may have the steps of: reading from a packet having a predetermined packet type disjoint to the second set associated therewith, a scalability axes descriptor defining the number n and a semantic meaning of the one or more scalability axes, and interpreting the operation point identifiers depending on the scalability axes descriptor.

According to another embodiment, a method for processing a data stream into which a media content is coded, the data stream including packets, each packet including an packet type identifier identifying a packet type associated with the respective packet, out of a plurality of packet types, wherein each packet having a packet type out of a first set of the plurality of packet types associated therewith, includes an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, may have the steps of: reading from a packet having a predetermined packet type disjoint to the second set associated therewith, a sequence of profile and/or level descriptors each associated with one or more of at least a subset of the plurality of operation points, each profile and/or level descriptor defining an available coding option set and/or an available syntax element value range which a syntax of packets having an operation point associated with the respective profile and/or level descriptor, associated therewith, obey, wherein the network entity is configure to, responsive to a signaling in the data stream, explicitly read from a first set of the profile and/or level descriptors the definition of the available coding option set and/or available syntax element value range, and read, for a second, disjoint non-empty set of the profile and/or level descriptors, a reference to another profile and/or level descriptor and derive the definition of the available coding option set and/or available syntax element value range of the second, disjoint non-empty set of the profile and/or level descriptors from the respective referenced profile and/or level descriptor.

Another embodiment may have a computer program for performing an inventive method for processing, when the computer program runs on a computer or processor.

It is a basic finding of the present invention that the handling of scalable data streams by network entities is rendered less complex if, in the data stream, packets which actually carry data are accompanied by packets of a different packet type which have a scalability axes descriptor defining the number of scalability axes and a semantic meaning thereof. By this measure, it is sufficient if the data carrying packets comprise an operation point identifier identifying an operation point associated with a respective packet within the scalability space spanned by the scalability axis. By this measure, the packet operation point identifiers provide enough information to a network entity so as to associate these packets with their operation point in the scalability space provided the network entity has access to this scalability axes descriptor provided by the packet of the predetermined packet type. In effect, the technique allows for reducing the amount of data to be consumed for the majority of the packets as the operation point identifiers merely have to fulfill an identification task. The scalability axes descriptor may be transmitted less frequently. Concurrently, the network entity also has to perform the cumbersome task of parsing/reading the scalability axes descriptor less frequently, thereby reducing the overhead for the network entity. On the other hand, in accordance with an embodiment of the present invention, the network entity is able to interpret the operation point identifiers at least to the extent so as to distinguish packets of the lowermost operation point in the sequential operation point order, i.e. base layer packets, from other packets, i.e. packets belonging to operation points positioned higher in the sequential operation point order, i.e. "enhancement" layer packets.

In accordance with another aspect of the present invention which may be combined with a first one or may be implemented individually, it is a basic finding of the present invention that the handling of scalable data streams by network entities may be rendered more efficient if level and/or profile descriptors are conveyed using packets other than the data carrying packets, with profile and/or level descriptors being divided up into a first set explicitly signaling the definition of the available coding option set and/or available syntax element value range for a respective operation point, and a second set of profile and/or level descriptors which signal the definition of the available coding option set and/or available syntax element value range for their respective operation points by reference another profile and/or level descriptor. By this measure, the length of the whole sequence of profile and/or level descriptors is kept lower, thereby saving transmission overhead as well as parsing overhead.

BRIEF DESCRIPTION OF THE DRAWINGS

Embodiments of the present invention will be detailed subsequently referring to the appended drawings, in which:

FIG. 2 shows a schematic diagram of a scenario where a network entity receives a complete data stream;

FIG. 3a illustrates operation points within a two-dimensional scalability (e.g. temporal and spatial);

FIG. 3b illustrates a new_profile_level_flag concept;

FIG. 4 shows an NAL unit header syntax for HEVC;

FIG. 5 shows a VPS syntax;

FIG. 6 shows a vps_extension_data( ) syntax;

FIG. 11 shows an NAL unit syntax;

FIG. 12, including FIGS. 12a, 12b, and 12c, shows an SPS syntax;

FIG. 13 shows a VPS syntax; and

FIG. 14 shows a VPS extension data syntax.

DETAILED DESCRIPTION OF THE INVENTION

Figure 1A:
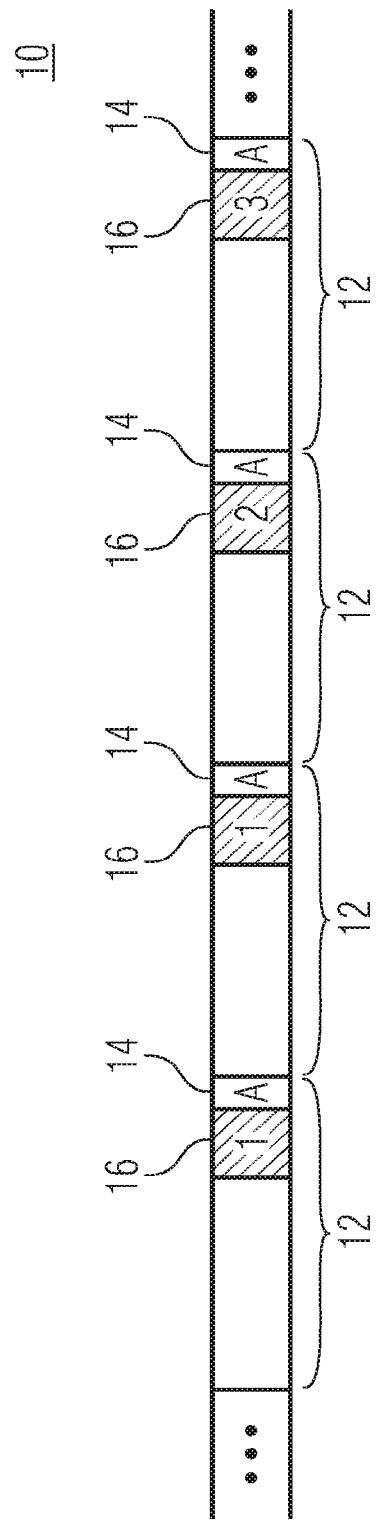
FIG. 1a shows a schematic of a data stream into which a media content is coded.

In order to ease the understanding of the embodiments outlined below, with respect to FIGS. 1 and 2 the specifics of scalable data streams and the problems in handling scalable data streams resulting from these specifics are described first. FIG. 1a illustrates a data stream 10 into which a media content is coded such as, for example, audio content, video content, picture content, 3D mesh content or the like. The media content may be time-varying with the data stream representing the media content in a sequence of time stamps such as picture of a video, transform blocks or frames of an audio signal or the like.

As shown in FIG. 1a, the data stream 10 comprises, or is composed of, packets 12. The packets may be equal in size or may differ in size. Each packet comprises a packet type identifier 14. Each packet type identifier 14 identifies a packet type associated with a respective packet 12, out of a plurality of packet types. The plurality of packet types comprises data carrying packet types. In FIG. 1a, for example, the packets within the portion of data stream 10 exemplarily shown in FIG. 1a is exemplarily shown to be of such a data carrying packet type, here exemplarily denoted as "A". Besides such data carrying packet types, there may be other packets of other packet types which do not carry data actually contributing to a coded representation of the media content, but other data such as, for example, supplementary data or information on the origin of the media content or the like.

At least each packet of a data carrying packet type such as A, comprises an operation point identifier 16 identifying an operation point associated with a respective packet, out of a plurality of operation points within a scalability space spanned by a number n of scalability axes, with 0>n, the operation points having a sequential operation point order defined thereamong. To render this clear, reference is made to FIG. 1b. The operation points are illustrated by circles 18. They are distributed or arranged within the scalability space 20 spanned by the scalability axes, wherein in FIG. 1b, for illustrative purposes, merely two such scalability spaces axes 22a and 22b are shown.

Figure 1B:
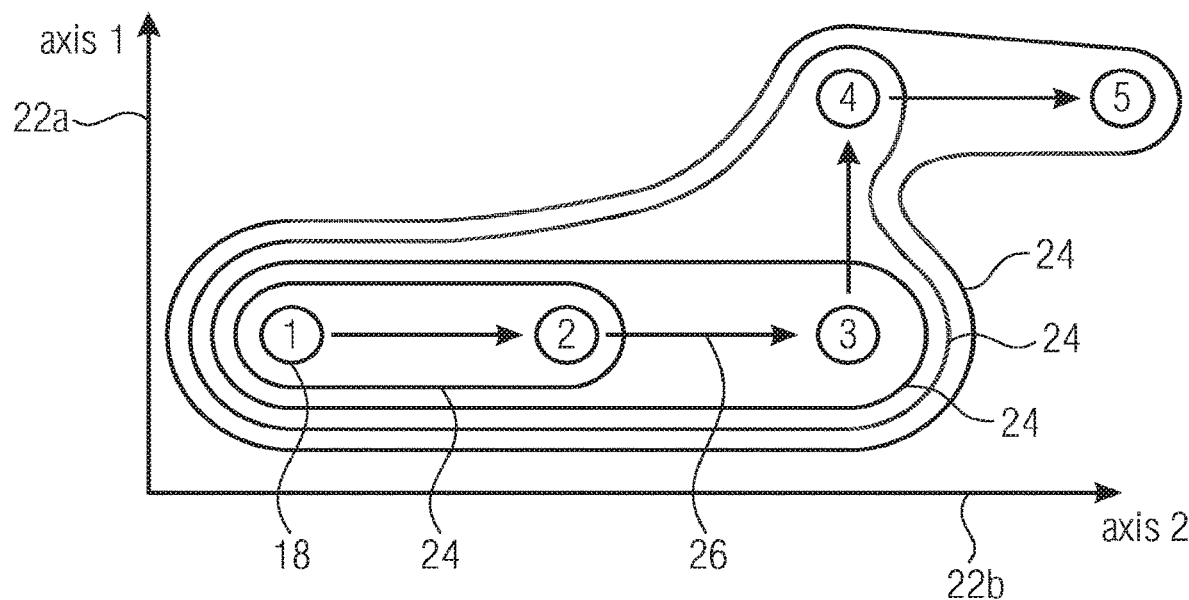
FIG. 1b schematically illustrates a composition of scalable data streams.

FIG. 1b illustrates the composition of scalable data streams such as scalable data stream 10. Packets 12, the operation point identifier of which identifies operation point 1, carry data which together form a coded representation of the media content at that operation point 1. Here, exemplarily, operation point 1 forms a kind of basic representation, i.e. a minimum amount of information concerning the media content is provided by the data of the packets of operation point 1. In case of a video, for example, the data of these packets represent a coded representation of the media content at low spatial resolution and lowest SNR, for example. By combining the data carried by packets belonging to operation point 1 with the data carried by packets 12 of operation point 2 as illustrated by loop line 24, the data thus derived results in a coded representation of the media content, the reconstruction of which somehow exceeds the representation obtained by reconstructed media content from the packets of operation point 1 only, such as for example in SNR or spatial resolution. The characteristic of the media content relating to which the coded representation is extended by adding the data of packets of operation point 2 to the data of the packets of operation point 1 is the semantic meaning of axis 2 in FIG. 1b and the scale of axis 22b is an ordinal scale which sorts the operation points 18 according to this semantic meaning.

In FIG. 1b, for example, axis 22b relates to the spatial resolution, while axis 22a relates to SNR quality. However, other semantic meanings of scalability axes may be available as well. For example, the additional data of packets of a further operation point may add information to the reconstructible version of the media content which was not available before, i.e. before adding this data, such as for example another view, another audio channel, a depth map or the like.

Accordingly, FIG. 1b likewise illustrates by further loop lines 24 that the basic coded representation of the media content may extend along axis 22b as well as along 22a. In other words, the addition of data of packets 12 of a certain operation point to data of packets of another operation point or a combination 24 of data of packets of other operation points leads to a new combination of data which, in accordance with one of the scalability axes 22a or 22b, exceeds the representation obtained without this addition, and this sequential effect is shown by the arrows 26, which accordingly form a sequential operation point order among the operation points 18, which leads through the scalability space 20.

Now, imagine that a network entity receives such a complete data stream. FIG. 2 shows such a scenario. The network entity is shown as a block 28 and is, for example, a decoder, or a MANE. In FIG. 2, network entity 28 receives a complete data stream 10, i.e. a data stream comprising all of the data packets including all data carrying data packets of all operation points. The network entity 28 has the task of providing a recipient 30 with a media content. In FIG. 2, network entity 28 is exemplarily to use a wireless transmission 32 to forward the media content to recipient 30. The network entity 28 is, for example, a mobility management entity. In such a scenario, the network entity 28 has to cope with time-varying transmission capacities to recipient 30. That is, there are time instances where the transmission capacity is not sufficient in order to transfer the complete data stream 10 to recipient 30 to be reproduced in real time, for example. Thus, network entity 28 has to "reduce" the data stream 10 so as to provide recipient 30 with a trimmed down version or representation of the media content. While, for example, the transmission capacity is insufficient in order to transmit the complete data stream 10, the transmission capacity may however be sufficient to transmit data stream 10 with packets 12 of operation point 5 being omitted, for example.

It should be noted that there are other scenarios as well where a network entity 28 has to drop some of the packets 12 in order to meet some externally driven constraints. Insofar, FIG. 2 merely serves as an example.

However, in order to perform the just mentioned task of reducing the data stream, network entity 28 has to inspect at least portions of the data stream. The portions to be inspected include the operation point identifiers 16. This puts a high burden onto network entity 28 and accordingly it would be favorable to keep this overhead low. The embodiments described next achieve this aim.

Another aspect which the embodiments described hereinafter deal with relates to the fact that the capabilities of a decoder allotted for decoding the data stream may increase while extending the sequential operation point order. Low level decoders, for example, may have lower capabilities, i.e. are of lower profile and/or lower level as explained in the introductory portion of the specification. Thus, the adding of some data of packets of a certain operation point may thus be restricted to decoders which meet some minimum profile and/or minimum level criterion and accordingly it would be favorable if network entities such as a decoder or some network entity forwarding the data stream to a decoder would be able to understand the profile and/or level requirements associated with the operation points 18 in a simple manner, but on the other hand with a low rate consumption.

Before starting the description of these embodiments, however, the following is noted. In particular, the nomenclature applied in the embodiments described next differs from the wording used in the description referring to FIG. 1a to 2. To be more specific, the embodiments described next represent specific implementations of embodiments of the present application tailored to be applied in the upcoming HEVC standard. Accordingly, the above mentioned packets are denoted below as NAL units, the NAL unit header of which comprises an operation point identifier which, in accordance with embodiments relating to a first aspect of the present application, are further specified by a scalability axes descriptor in a certain type of NAL unit, namely VPS NAL units. However, the specific embodiments described now are readily transferable to other types of codecs. Insofar, the following embodiments shall be understood merely as illustrative.

Figure 1C:
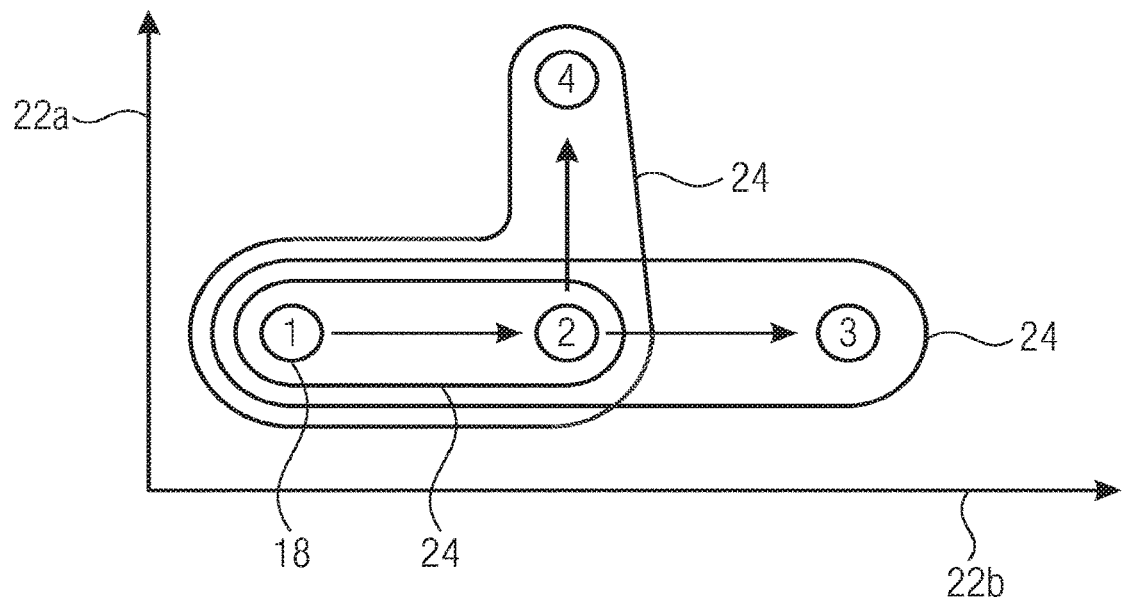
FIG. 1c schematically illustrates a composition of scalable data streams m accordance with another example.

Similarly, although FIG. 1b is suggestive of combinations 24 merely forming proper subsets to each other so that each combination is either a proper subset of all other combinations 24, one of a proper subset or a proper superset of the other combinations 24 or a superset of all other combinations 24 is optional. FIG. 1e, for example, shows a case where the sequentially of the operation point 18, i.e. the property to have a sequential operation point order defined thereamong, is to be understood as encompassing cases where the combinations also comprise the case where one combination is neither a proper subset nor a proper superset of the other combination. In FIG. 1c, for example, the combination 24 resulting from adding the data of packets of operation point 4 to the data of the combination of packets of operation points 1 and 2 overlaps with the combination 24 resulting from adding the data of packets of operation point 1e to the combination of data of packets of operation points 1 and 2 merely partially, with the intersection being formed by the latter combination, i.e. the combination of operation points 1 and 2. Thereby, the sequential operation point order comprises a branch at operation point 2.

The following embodiment presents a high level syntax including an NAL unit header and a VPS syntax that allows for signaling of scalability information in a way to be useful in video decoders, video bitstream extractors or network devices for adaptation. The NAL unit header includes a scalability identifier that allows signaling up to three dimensions of scalability.

Before describing the VPS syntax in further detail, an overview is presented with respect to FIGS. 3a and 3b. The concepts may be used, for example, in the HEVC standard.

The new_profile_level_flag, present below, is used to signal that a certain operation point within the scalability dimensions of the video (e.g. temporal, spatial or any other) uses a different profile or level than the formerly described operation points. FIG. 3a shows the different operation points within a spatial and temporal scalable video sequence according to their scalable identifiers (temporal_id and layer_id). FIG. 3a illustrates operation points within two-dimensional scalability (e.g. temporal and spatial).

The Profile and Level needed to describe decoders capabilities in terms of supported coding tools, macroblock throughput and so on, might change with every operation point, which strongly depends on the scalability in use. In loops that signal profile and level or further parameters of operation points, the new_profile_level_flag is used to signal whether a new profile and level with respect to the formerly described operation points is present or to that the profile and level of a specific operation point has to be inherited from a formerly described ones by explicit reference.

Another aspect described below relates to an adaptable list of profile and level syntax elements. Profile, Level and optionally other parameters of operation points in parameter sets are given via while loops that allow for straight-forward adaptation, i.e. the exclusion or cut out of certain operation points as well as the adding thereof without changing other syntax elements within the given syntax, i.e. within the VPS. This is achieved by using the more_rbsp_data( ) syntax element that allows for a while loop which has no necessity for signaling the absolute number of layers and thereby eases the adaptation of parameter sets. FIG. 3b illustrates a new_profile_level_flag concept.

Another aspect described below relates to Layer scenarios. Layer scenario represents a ways in which to signal a interpretation of the five reserved bits in the second byte of the NAL unit header that may be used in HEVC extensions as scalable layer identifier layer_id in a scalable context.

In the layer scenario approaches, a scenario identifier is signaled in the NAL unit header that allows a decoder or MANE to interpret the five reserved bits as separate one- or many-dimensional identifier for video codings that feature one or multiple dimensions of scalability, such as temporal and spatial, spatial and multiview or others. A detailed description of the scalable dimension and the operation points within is given by means of the VPS, whereas the NAL unit header only provides information on how to interpret the five reserved bits of the NAL unit header syntax in order to derive one or more scalable identifiers.

The VPS syntax described next provides means to signal profile and level of each operation point and is designed to allow for straight-forward on-the-fly adaptation. The following sections give details on this syntax.

The proposed NAL unit header syntax is described first.

The second byte of the NAL unit header is used to signal a so called layer scenario (layer_scenario) and a scalability identifier (layer_id) that identifies an operation point in the context of the layer scenario.

FIG. 4 gives the NAL unit header syntax for HEVC with the new syntax elements layer_scenario and layer_id. The syntax element layer_scenario signals the scenario of scalability dimensions, for example, one scalability dimension for using only temporal scalability (e.g. temporal scalability as in the HEVC base specification) or combining two types of scalability (e.g. temporal and spatial). The syntax element layer_id describes the operation point of a specific NAL unit within the signaled scalability dimensions and has to be interpreted according to the layer_scenario syntax element.

In the case of no or one dimension of scalability, i.e. layer_scenario with a value of zero, the value of layer_id can be interpreted as an unsigned integer, listing the operation points in consecutive order according to their decoding dependencies and importance. In case of no scalability, all NAL units shall have a layer_id value of zero to signal that there is no meaningful hierarchical adaptation procedure and all NAL units are of the same importance.

With two dimensions of scalability, i.e. layer_scenario with a value of one, the value of layer_id can be interpreted as two 3-bit unsigned integer variables. The first three bits giving the operation point of the NAL unit in the first scalability dimension, e.g. temporal, and the second 3-bits give the operation point of the NAL unit in the second scalability dimension, e.g. spatial.

When layer_scenario has a value of two, the value of layer_id can be interpreted as a 2-bit unsigned integer variable giving the operation point in the first scalability dimension, followed by a 4-bit unsigned integer variable describing the operation point in the second scalability dimension. This scenario can be beneficial when the amount of layers of one dimension is larger than in the other dimension.

Given three dimensions of scalability, the corresponding value of layer_scenario is three, and the value of the layer_id syntax element can be interpreted as three 2-bit unsigned integer variables giving the operation point according to the three scalability dimensions in use, e.g. temporal, spatial and multiview scalability.

Table 2 gives an overview on the values of layer_scenario and presents the corresponding interpretation of layer_id.

TABLE 2

Overview of layer_scenario values.

| layer_scenario | Number of scalability dimensions | interpretation of layer_id | number of possible operation points per dimension |
|---|---|---|---|
| 0 | 0-1 | one 6-bit unsigned integer | 64 |
| 1 | 2 | two 3-bit unsigned integer | 8 |
| 2 | 2 | one 2-bit and one 4-bit unsigned integer | 4 (first dimension) and 16 (second dimension) |
| 3 | 3 | three 2-bit unsigned integer | 4 |

The corresponding video parameter set syntax is described next.

The syntax of the Video Parameter Set has to be adjusted in order to signal profile and level for each operation point in the possibly three dimensional scalability space and provide means to adapt it in a straight-forward way to reflect the current level of adaptation of the video bitstream. This is achieved by using the vps_extension_data( ) syntax element for profile and level signaling of NAL units that use any kind of scalability, e.g. temporal, spatial or others. Furthermore, it provides detailed information for the interpretation of the layer_id syntax element within the NAL unit header.

The VPS syntax given is given in FIG. 5.

FIG. 5 signals profile and level for NAL units that do not use any kind of scalability, i.e. video data coded according to the HEVC base specification with the lowest temporal level.

Furthermore, the syntax element layer_id_type is given in order to allow a more detailed understanding of the scalability dimensions described with the layer_id syntax element within the NAL unit header syntax. Table 1e specifies the actual scalability dimensions signaled in layer_id for the layer_id_type syntax element. For the HEVC base specification, only temporal scalability has to be defined. Future HEVC scalability extension would consequently specify further layer_id_type values for their specific needs, e.g. 1: temporal scalability, 2: spatial scalability for an SVC-like extension of HEVC.

This allows any device in possession of the VPS to completely interpret the operation point of a NAL unit within the known scalability dimensions, whereas devices that do not have access to the VPS can still perform correct adaptation of the video bitstream but without knowledge of the actual scalability dimensions.

TABLE 3 layer_id_type and detailed description of scalability dimension in layer_id

| layer_id_type | Scalability dimensions |
|---|---|
| 0 | none |
| 1 | 1: temporal scalability |
| 1 . . . 127 | Unspecified |

Descriptions of operation points that use scalability in any dimensions (e.g. temporal level>0, spatial scalability) are given by means of the vps_extension_data( ) syntax as given in FIG. 6. Each operation point is identified via its layer_id. The new_profile_level_flag allows for either explicit signaling of profile and level of the described operation or implicit signaling by referencing another operation point description by its layer_id using the syntax element ref_layer.

Using the vps_extension_data( ) syntax allows for adaptation in a straight-forward way, as operation points are explicitly referenced and can be omitted by excluding a fixed number of bytes. Whenever the omitted vps_extension_data( ) syntax is not referenced by other operation point description, no bits of the VPS have to be changed apart from the omitted ones, which simplifies on-the-fly adaptation considerably.

Figure 7:
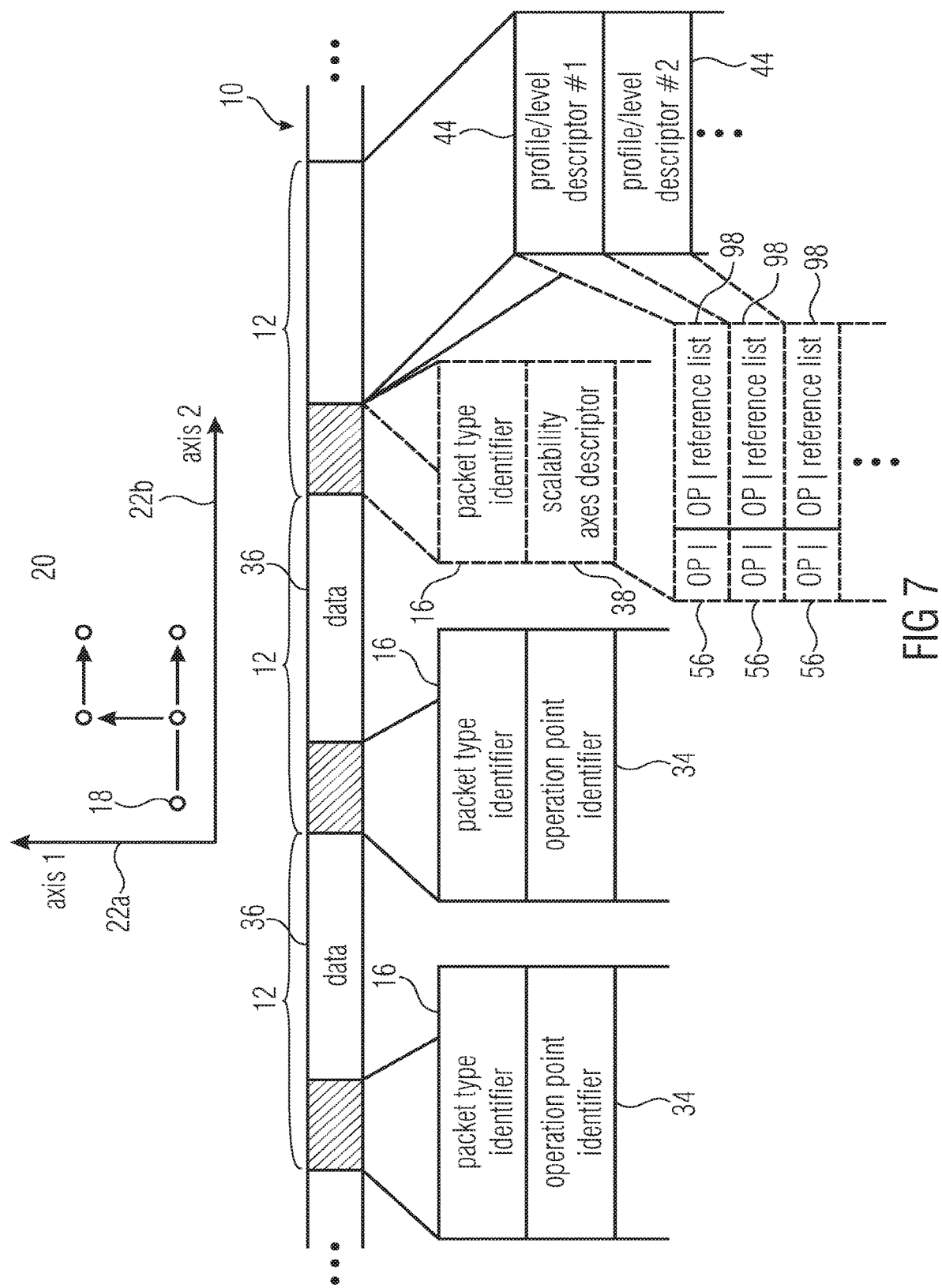
FIG. 7 shows a schematic diagram of a data stream m accordance with an example.

Thus, using the nomenclature applied with respect to FIGS. 1a to 1c, the just outlined specific embodiments describe a data stream composed as depicted in FIG. 7. The data stream which is generally indicated using reference sign 10 has a media content coded thereinto such as, as denoted above, audio, video or other media content. The data stream 10 comprises packets 12 called NAL units. Each packet 12 comprises a packet type identifier, namely nal_unit_type, identifying a packet type associated with a respective packet 12 out of a plurality of packet types. Each packet 12 having a packet type out of a first set of the plurality of packet types associated therewith such as all NAL units, comprises an operation point identifier 34, namely the combination of layer_scenario and layer_id, identifying an operation point 18 associated with the respective packet 12, out of a plurality of operation points 18 within the scalability space 20 spanned by a number n of scalability axes 22a, b with 0>n, the operation points 18 having a sequential operation point order defined thereamong. In this regard, it should be noted that not necessarily each NAL unit or packet 12 has an operation point identifier 34. Rather, there may be packets 12 of a certain packet type, which are of general nature as far as the operation points are concerned and accordingly do not comprise any operation point identifier.

In the embodiment of FIG. 7, however, each packet 12 having a packet type out of a second set of the packet types associated therewith, namely the non-VPS NAL units, additionally carries data 36 contributing to a coded representation of the media content at the operation point 18 associated with a respective packet along with packets 12 having any operation point associated therewith which precedes the operation point associated with the respective packet, or equals the operation point associated with the respective packet in accordance with the sequential operation point order. Reference is made to the description of FIG. 1b and FIG. 1c for details in this regard.

Each packet having a predetermined packet type disjoint to the second set of packet types associated therewith, has a scalability axes descriptor 38 defining the number n and a semantic meaning of the one or more scalability axes with the scalability axes descriptor 38 being represented by layer_id_type occurring in the VPS NAL units, i.e. NAL units 12 where the rbsp data portion 40 is filled according to the VPS syntax 42.

As also described above, each VPS packet may also comprise a sequence of profile and/or level descriptors 44, namely vps_extension_data, individually associated with at least a subset of the plurality of operation points 18 such as, for example, the leading ones in terms of the sequential operation point order. Each profile and/or level descriptor 44 defines an available coding option set, i.e. a minimum profile to be supported for reconstruction purposes and/or an available syntax element value range, i.e. a minimum level necessitated for reconstruction, which a syntax of packets 12 having the operation point associated with the respective profile and/or level descriptor 44, associated therewith, obey. In other words, the combination of data resulting from adding the data of packets of a certain operation point 18 to data of packets associated with one or a combination of other operation points 18, is reconstructible only for decoders which support the respective profile and/or level.

A first set of the profile and/or level descriptors 44 explicitly signal the definition of the available coding option set and/or available syntax element value range, namely those for which the syntax element new_profile_level_flag, i.e. flag 46, equals 1. A second, disjoint non-empty set of the profile and/or level descriptors 44 signal the definition of the available coding option set and/or available syntax element value range by referencing another preceding profile and/or level descriptor 44, namely those for which new_profile_level_flag equals 0. In FIG. 6 the explicit signaling of profile is done using syntax element profile_idc at 48, while syntax element level_idc represents a level indicator 50. The referencing to another profile and/or level descriptor 44 in case of new_profile_level_flag=0, is done using a syntax element ref_layer_id 52. Obviously, the use of referencing profile and/or level descriptors 44 reduces the size necessitated for transmitting the sequence 54 of profile and/or level descriptors, and this aspect may, as further outlined below, be exploited independent from the co-use of the operation point identifier 34 and the scalability axes descriptor 38.

While the sequence 54 of profile and/or level descriptors 44 may be sequentially associated in the sequential operation point order with the at least subset of plurality of operation points, this is not necessarily the case. Rather, each profile and/or level descriptor may have a field 56, namely layer_id, which identifies the operation point 18 the respective profile and/or level descriptor 44 is associated with. The network entity which deals with the data stream 10 may ascertain the sequential operation point order defined among the operation points 18 from the order of the fields of the profile and/or level descriptors 44 in sequence 54. Alternatively, however, the sequential operation point order may be known to the network entity by default depending on, for example, the scalability axes descriptor. To be even more precise, the order of the operation points identified by the fields 56 and the sequence of the profile and/or level descriptors 44 may be used by a network entity such as network entity 28 of FIG. 2, so as to derive the sequential operation point order.

Figure 8:
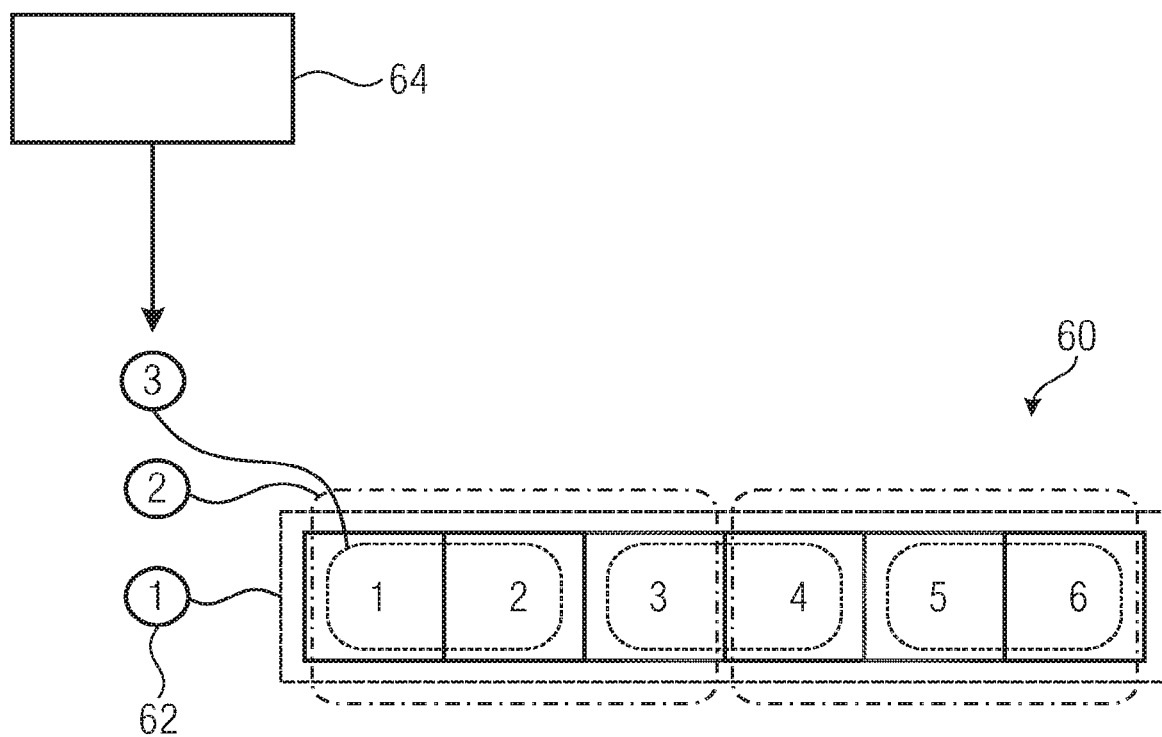
FIG. 8 shows a flow diagram for an example for partitioning the fixed-bit-length syntax element or bit sequence, respectively.

The field 56 may identify the respective operation points using a bit sequence which is common to the operation point identifiers 34. In the embodiment outlined below, for example, all operation point identifiers 34 had a fixed-bit-length syntax element, namely layer_id, and a scenario syntax element, namely layer_scenario, where the scenario syntax element signaling n and an association of n partitions of the fixed-bit-length syntax element with the n scalability axes, the fixed-bit-length syntax element is common to, or equally constructed to, the bit sequence of fields 56. FIG. 8 illustratively shows an example for partitioning the fixed-bit-length syntax element or bit sequence 60 of fields 56 or fixed-bit-length syntax element of the operation point identifier 34 into a different number of partitions in accordance with three different states 62 of the scenario syntax element 64 with the partitions exemplarily shown with a dashed line for a first state, a dash-dot line for a second state and dotted lines for a third state. That is, a network entity interpreting the fixed-bit-length syntax element or bit sequence 60 may identify the correct operation point identified by the respective fixed-bit-length syntax element or bit sequence 60 by using the bits contained in the individual partitions as components in the n-dimensional scalability space 20.

In the embodiment described below, the bit sequence used for the syntax element ref_layer_id 52 uses the same bit sequence as shown in FIG. 8. Alternatively, a relative pointer defined in units of ranking positions in the sequential operation point order may have been used. For example, the network entity may merely add ref_layer_id bit-wise to syntax element layer_id 56 so as to access or obtain the layer_id of the operation point which the current profile and/or level descriptor 44 refers to so as to adopt the profile identifier and/or level identifier profile_idc and/or level_idc 48 and/or 50 for the current operation point.

In the embodiment described above, the scalability axes descriptor 38, namely layer_id_type, forms a syntax element, the possible states of which are individually associated with different combinations of values for n and the corresponding semantic meaning of the n scalability axis. That is, possible states of the scalability axes descriptor are individually mapped to different (n) meaning (1), . . . , meaning (n) (wherein reference is made to table 3). That is, using the scalability axes descriptor 38, a network entity reading the data stream knows about the semantics of meaning of the property for which the values within the partitions in FIG. 8 are in ordinal measure. A network entity which, however, has not yet had an opportunity to successfully read a VCL NAL unit, may however at least rely on the ordinal characteristic of the values in the partitions of bit sequence 60 of operation point identifiers 34 as obtained using the partitioning according to the scenario syntax element 64, so as to decide on possible reductions of the data stream in processing the data stream.

Before proceeding to the next specifically outlined embodiment, it is noted that in accordance with the above mentioned further aspects of the present application, the scalability axes descriptor 38 could be omitted with the semantics thereof being included, for example, in the operation point identifiers 34, which would however accordingly have to consume more bits than compared to the embodiments described right now. Nevertheless, however, such alternative embodiments would still be advantageous in that the above described sequence 54 of profile and/or level descriptors 44 is present, which involves both explicitly signaling profile and/or level descriptors 44 as well as indirectly signaling/referencing profile and/or level descriptors 44.

With regard to the description above, however, it should be noted that various modifications could be performed onto the embodiments outlined above. For example, the number of bits chosen in the above example for the fixed-length-syntax element or bit sequence 60, namely 6, could be changed to be greater or smaller. A similar note is valid as far as the possible scalability axes number n adjustable by scenario syntax element 64 is concerned: the set of possible states was (1, 2, 3), but a different set of possible integers for n could be realized as well.

Figure 9:
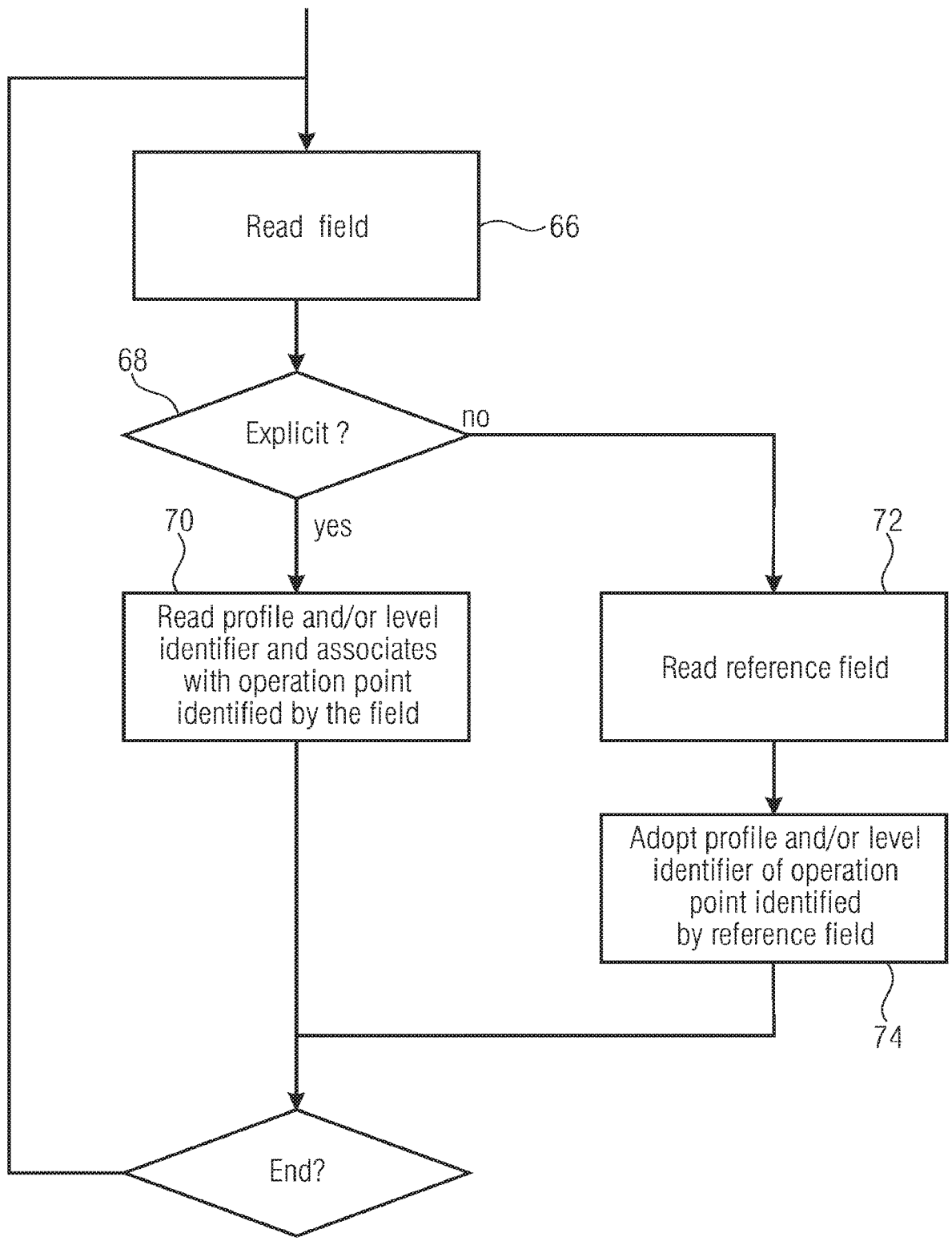
FIG. 9 shows a flow diagram for a mode of operation of an exemplary network.

For the sake of completeness only, FIG. 9 shows the mode of operation of a network entity which for example reads the sequence of profile and/or level descriptors 44. First of all, the field of the first profile and/or level descriptor 44 in list 54 is read at step 66. Then, the network entity checks at step 68 whether the current profile and/or level descriptor 44, the field of which was read in step 66, explicitly signals profile and/or level or indirectly signals the same. In accordance with the embodiment above, step 68 involves reading syntax element reserved_zero_one_bit with the actual decision being dependent on the value of the syntax element: explicit signaling is indicated by new_profile_level_flag being equal to 1, and the indirect signaling by the syntax element being equal to 0.

In case of the explicit signaling, the network entity reads in step 70 the profile and/or level identifier 58/50 and associates same with the operation point identified by the field read in step 66. In case of indirect signaling, however, the network entity reads in step 72 from the data stream the reference field 52 and adopts in step 74 the profile and/or level identifier associated with the operation point identified by this reference field 52 as the profile and/or level identifier of the operation point identified by the field read in step 66. These steps are then repeated until the sequence of profile and/or level descriptors 44 has been scanned through.

Figure 10:
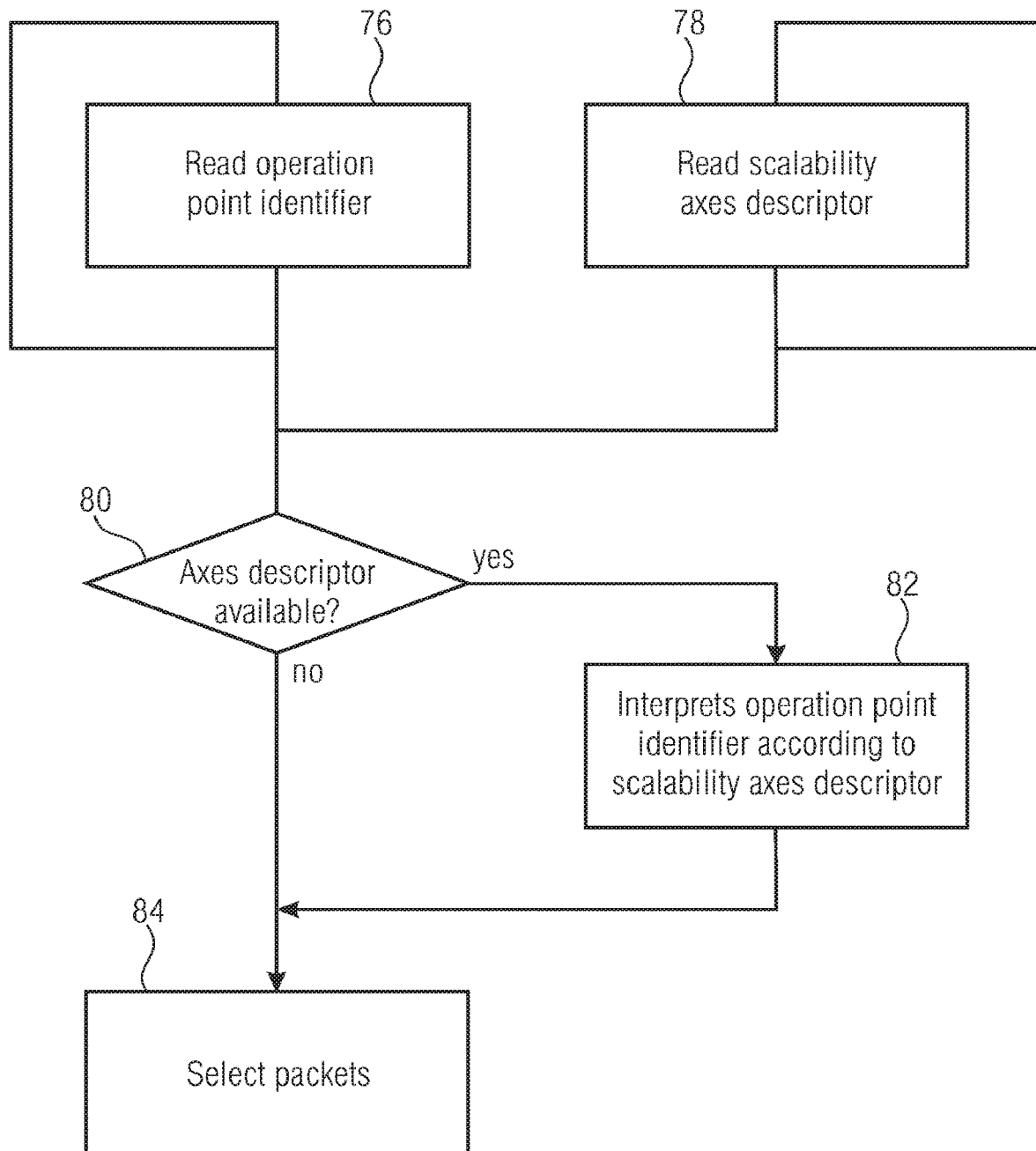
FIG. 10 shows another mode of operation of a network entity.

Similarly, FIG. 10 illustrates the mode of operation of a network entity which takes advantage of those embodiments described above, where the scalability axes descriptor 38 completes the information provided by the operation point identifiers 34 in the individual packets. As shown in FIG. 10, first of all the operation point identifier of a current packet is read in step 76. This is done for all packets 12. Further, the network entity inspects the VPS NAL units so as to read therefrom in step 78 the scalability axes descriptor. Both steps 76 and 78 are performed each time a respective packet of the respective packet type is encountered by the network entity. Each time an operation point identifier is read at step 76, the network entity distinguishes in step 80 between the case where the scalability axes descriptor has not yet been read, thereby not being available, or has already been read thereby being available. In case of the availability, the network entity interprets the operation point identifier of the current packet according to the scalability axes descriptor read in step 78 in step 82. After interpretation, the network entity knows about the meaning of the scalability axis and may act accordingly. In particular, irrespective of the availability or non-availability, the network entity selects packets out of packets 12 in step 84 such as selecting those packets which are to be decoded or to be forwarded to a recipient such as a recipient 30. The step 84 may be dependent on external data such as, for example, data indicating the recipient's capability of reproducing media data, such as maximum reproducible spatial resolution, maximum pixel bit depth of the display and so forth. In case the interpretation is not available due to the non-availability of the scalability axes descriptor, network entity 28 may be configured to act defensively by for example merely further processing the packets belonging to the lowest operation point in accordance with the sequential operation point order.

Again, the network entity 28 may be a decoder, a transcoder, a media aware network entity such as a mobility management entity or the like.

Moreover, an entity which generates any of the embodiments for a data stream described above, such as an encoder of the like, may be configured to intersperse the VPS NAL units in between the data carrying packets sufficiently frequently so as to keep the time durations low where a network entity faces the non-availability problems occurring if the scalability axes descriptor is not yet available as described with respect to FIG. 10.

For a network entity, which reads the sequence of profile and/or level identifiers 44, it is noted that such a network entity may be configured to in addition to the process of FIG. 10, or alternatively thereto, render a selection among the packets 12 based on the availability coding option set and/or available syntax element value range associated with the individual operating points: for example, the network entity may exclude operation points the necessitated profile and/or level of which exceeds the maximum profile and/or maximum level of itself in case of the network entity being a decoder, for example or of the recipient with which the network entity is communicating, in case of the network entity being, for example, an MME.

In other words, what has been described with respect to FIGS. 4 to 6 is a datastream into which a media content is coded, the datastream comprising packets (c.p. NAL units), each packet comprising an packet type identifier nal_unit_type identifying a packet type associated with the respective packet, out of a plurality of packet types, wherein each packet having a packet type out of a first set of the plurality of packet types associated therewith (e.g. all NAL units), comprises an operation point identifier layer_scenario and layer_id identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith (e.g. non-VPS NAL units), additionally carries data contributing to a coded representation of the media content at the operation point associated with the respective packet along with the packets having any operation point associated therewith which precedes the operation point associated with the respective packet, or equals the operation point associated with the respective packet, wherein each packet (c.p. VPS NAL units) having a predetermined packet type disjoint to (i.e. external to) the second set associated therewith, has an scalability axes descriptor (c.p. layer_id_type) defining the number of the one or more scalability axes and a semantic meaning thereof.

Another example of the datastream, wherein each of the packets having the predetermined packet type associated therewith, also comprises a sequence of profile and/or level descriptors vps_extension_data individually associated with at least a subset (e.g. the leading ones, in terms of the sequential operation point order) of the plurality of operation points, each profile and/or level descriptor defining an available coding option set (c.p. profile) and/or an available syntax element value range (c.p. level) which a syntax of packets having the operation point associated with the respective profile and/or level descriptor, associated therewith, obey, wherein a first set of the profile and/or level descriptors explicitly signal the definition of the available coding option set and/or available syntax element value range, (c.p. new_profile_level_flag=1) and a second, disjoint non-empty set of the profile and/or level descriptors signal the definition of the available coding option set and/or available syntax element value range by referencing another, preceding profile and/or level descriptor (c.p. new_profile_level_flag=1).

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field (c.p. layer_id) identifying the operation point the respective profile and/or level descriptor is associated with (i.e. along with 4), the sequential operation point order is derivable from the sequence of profile and/or level descriptors.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element (c.p. layer_id) and a scenario syntax element (c.p. layer_scenario), the scenario syntax element signaling n and an association (but without semantic meaning) of n partitions of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order (with the second alternative being an alternative to above description).

According to a further aspect of the datastream, all operation point identifiers have a fixed-bit-length syntax element and a scenario syntax element, the scenario syntax element signaling n and an association of n partitions of the fixed-bit-length syntax element with the n scalability axes so that the n-th portion is a ordinal measure of a position of the respective operation point along the n-th scalability axis.

According to another aspect of the datastream, the scalability axes descriptor (c.p. layer_id_type) comprises a syntax element the possible states of which are individually associated with different combinations of values for n and semantic meaning of the corresponding semantic meaning of the n scalability axes (i.e. a function maps {n,meaning(1), . . . , meaning(n)} to {1 . . . max. possible state of layer_id_type}).

In another datastream into which a media content is coded, the datastream comprises packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to (external to) the second set associated therewith, comprises a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another, preceding profile and/or level descriptor.

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field identifying the operation point the respective profile and/or level descriptor is associated with.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element and a scenario syntax element, the scenario syntax element signaling n and an association of n partitions of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the datastream, all operation point identifiers have a flag signaling as to whether same belongs to the first set of the profile and/or level descriptors explicitly signaling the definition of the available coding option set and/or available syntax element value range, and the second, disjoint non-empty set of the profile and/or level descriptors signaling the definition of the available coding option set and/or available syntax element value range by referencing another, preceding profile and/or level descriptor.

Another aspect may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configure to read from a packet having a predetermined packet type disjoint to (i.e. external to) the second set associated therewith, a scalability axes descriptor defining the number of the one or more scalability axes and a semantic meaning thereof, and interpret the operation point identifiers depending on the scalability axes descriptor.

In another example, the network entity is configured to read from the packet having the predetermined packet type disjoint to (external to) the second set associated therewith, a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example of the network entity, the sequence of profile and/or level descriptors is sequentially associated, in the sequential operation point order, with the at least subset (e.g. the leading ones, in terms of the sequential operation point order) of the plurality of operation points.

In another example of the network entity, each profile and/or level descriptor has a field identifying the operation point the respective profile and/or level descriptor is associated with.

In another example of the network entity, in each profile and/or level descriptor, the field identifies the operation point the respective profile and/or level descriptor is associated with, using a bitsequence common to the operation point identifiers identifying the operation point the respective profile and/or level descriptor is associated with.

In another example of the network entity, all operation point identifiers have a fixed-bit-length syntax element and a scenario syntax element, the scenario syntax element signaling n and an association of n partitions of the fixed-bit-length syntax element with the n scalability axes, wherein the bitsequence is common to the fixed-bit-length syntax element.

In another example of the network entity, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the network entity, all operation point identifiers have a fixed-bit-length syntax element and a scenario syntax element, wherein the network entity is configure to use the scenario syntax element to determine n and associate n partitions of the fixed-bit-length syntax element with the n scalability axes so that the n-th portion is a ordinal measure of a position of the respective operation point along the n-th scalability axis.

In another example, the network entity is configured to render a selection among the packets having any packet type out of the first set of the plurality of packet types associated therewith based on the interpretation.

Another example may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configure to read from a packet having a predetermined packet type disjoint to (external to) the second set associated therewith, a sequence of profile and/or level descriptors sequentially associated, in the sequential operation point order, with at least a subset (the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example, the network entity is configured to render a selection among the packets having any packet type out of the first set of the plurality of packet types associated therewith based on the associated available coding option set and/or an available syntax element value range.

The description of the next embodiment starts with a further introduction which would be, however, also transferable to the embodiments described so far.

Besides recording, storing and playout of video, the transmission thereof is a major application in today's communication networks. The unsteady nature of specific communication channels necessitates means of adaptation to be provided by the high level syntax of HEVC to perform well in different environments. Straight-forward adaptation of video bitstreams within the network during transmission, e.g. by Media-Aware Network Elements (MANEs), is one of the major challenges. Such devices usually only have limited resources in terms or processing power and have to operate with very low delay which prevents in-depth bitstream analysis.

The demands of this setup were already identified within the standardization of H.264/AVC. The encapsulation of video data into Network Abstraction Layer (NAL) units and the design decision to signal many important but rather invariant parameters outside the video bitstream in so called Parameter Sets reflect this understanding. A lack of extensibility of the base specification of H.264/AVC led to complicated approaches to extend the H.264/AVC high level syntax in a backwards-compatible way when extensions were specified. For HEVC, a flexible and extensible high level syntax should be taken care of in the base specification. Therefore, the high level syntax has to provide devices, such as MANEs, with the necessitated information in an accessible form, e.g. not entropy decoded, and suitable for signaling adaptation in a straight-forward way.

The below takes on the concept of a Video Parameter Set (VPS) as defined in the current draft specification to provide information necessitated for adaptation of the video bitstream, such as operation point descriptions and coding dependencies. It combines the information that in H.264 and its extensions is distributed across the layer specific sequence parameters sets (SPSs) and sits on top of the SPSs in the parameter set hierarchy.

The current definition of the VPS in the HEVC draft base specification defines the VPS to hold only redundant copies of some syntax related to sub-level demands for temporal scalability that are located in the SPS in H.264 and its extensions. Hence, the VPS is not necessitated for the decoding of the coded video sequence. In accordance with the embodiment below, however, redundant signaling is omitted and the syntax element is kept in the VPS only. Furthermore, in accordance with the embodiment below, however, the profile, level and sub-level demands signaling is changed in a way that its inherent hierarchy is reflected in their position within the hierarchy of parameters sets (VPS, SPS, and PPS). This means that the most basic and fundamental parameters for bitstream adaptation and capability exchange, i.e. profile and level information, are provided top of the parameter set hierarchy, namely the VPS, whereas less important sub-level demands, i.e. sps_max_latency_increase[i], vps_num_reorder_pics[i], vps_max_dec_pic_buffering[i] are signaled in the SPS as in former versions of the draft specification. In this way, we will make most important information available to MANEs in a straightforward way without the necessity to compile information from several SPSs. Applications that rely on lower level demands, such as sub-level demands for temporal scalability, can still find the desired information in an uncompiled form in lower steps of the parameter set hierarchy. Generally speaking, a non-application specific MANE is hardly interested in such low level capabilities information of end devices. Profile and level demands are expected to be fine-grained enough for most application and comer-case application can still retrieve this information from the lower-level parameter sets.

A VPS defined in this way allows a MANE to be fully aware of the scalability dimensions and profile and level associated with every operation point. Operation points within the scalability dimensions with redundant profile and level identifiers can be signaled by reference to decrease redundant signaling. Utilizing the VPS extension data syntax to signal individual operation point descriptions allows for straight-forward modular structure that can easily be constructed by an encoder.

A SEI message is proposed to make MANEs and receivers aware of possibly adapted video sequences, where not all the operation points described in the VPS and its extensions are present. Allowing MANEs to be aware of the actual (adapted) content of the video sequence is of importance to facilitate further adaptation, e.g. in a cascaded adaptation process with multiple MANEs.

In order to generically signal the operation point of a NAL unit within the occurring scalability dimensions on the NAL unit header level, the reserved bits in the second byte of the NAL unit header are used to signal a layer identifier to identify enhancement layers or views from the base layer or view. The information necessitated to interpret the layer identifier of a NAL unit in terms of the scalability dimensions of the coded video sequence is provided by means of the VPS. This signaling includes the type of scalability and information on how the individual bits of the layer identifier correspond to applicable scalability dimensions. This allows a MANE or any other device to correctly build a possibly multi-dimensional (temporal, quality, spatial, multiview, depth . . . ) scalability operation point matrix from the information provided in the NAL unit header and the VPS.

The NAL unit syntax of the embodiment described now is shown in FIG. 11 where layer_id_plus 1 minus 1 indicates the layer identification. A layer_id_plus 1 equal to 1 indicates that the layer identification is equal to 0, and the NAL unit belongs to the base layer or base view. Higher values of layer_id_plus1 indicate that the corresponding NAL unit belongs to an enhancement layer or view associated with the specified layer_id_plus 1.

The corresponding SPS syntax is shown in FIG. 12 and the corresponding VPS syntax in FIG. 13, where: scalability_type indicates the scalability types in use in the coded video sequence and the dimensions signaled through layer_id_plus1 in the NAL unit header. When scalability_type is equal to 0, the coded video sequence conforms to the base HEVC specification, thus layer_id_plus1 of all NAL units is equal to 1 and there are no NAL units belonging to an enhancement layer or view. Higher values of scalability_type have to be interpreted according to Table 4.

profile_space, profile_idc, constraint_flags, and profile_compatibility_flag signal information as specified in the current WD and the indicated values are valid for all NAL units with a layer_id_plus 1 equal to 1.

level_idc[i] signals information as specified in the current WD and the indicated values are valid for all NAL units with a layer_id_plus1 equal to 1 and a temporal_id equal to i.

layer_id_plus 1_dim_len [dim] indicates the length in bits of layer_id_plus 1 that is used to signal the n-th scalability dimension according to FIG. 13 beginning at the MSB for n=0 or the end of the (n−1)-th signaled scalability dimension for n>0.

TABLE 4

Proposed sealabITHtY. t:ype mappm2 table

| scalability_type | max_dim | dimensions |
|---|---|---|
| 0 | 1 | none |
| 1 | 2 | spatial and quality scalability |
| 2 | 2 | multiview and depth scalability |
| 3 | 4 | multiview, spatial, quality and depth scalability |
| 4-15 | reserved | reserved |

The scalability types exemplarily defined in Table 4 represent a set of scalabilities which can be anticipated at this point in time, but may be extended with new dimensions and/or combinations once the work on HEVC extensions progresses.

The corresponding VPS extension data syntax is shown in FIG. 14, where:

vps_extension_type indicates the type of the VPS extension. When the value of vps_extension_type is equal 0, the syntax given above applies.

layer_id_plus 1 indicates the layer_id for which the syntax elements signaled in the VPS extension are valid.

max_temporal_layers_minus1 plus 1 specifies the maximum number of temporal sub-layers that may be present in NAL units with a layer_id_plus1 equal to the layer_id_plus1 signaled in the VPS.

new_profile_level_flag equal to 0 indicates that the profile and level signaling associated with a value of layer_id_plus 1 equal to the values specified by profile_reference_layer_id_plus1 is valid for the NAL unit with layer_id_plus1 specific within the VPS extension. new_profile_level_flag equal to 1 indicates that profile and level for the specified value of layer_id_plus1 is signaled explicitly in the VPS extension.

profile_reference_layer_id_plus1 indicates the value of layer_id_plus1 whose associated profile and level signaling is valid for NAL units with a value of layer_id_plus1 equal to the value of layer_id_plus1 signaled in the VPS extension.

profile_space, profile_idc, constraint_flags, and profile_compatibility_flag signal information as specified in the current WD and the indicated values are valid for all NAL units with a layer_id_plus1 equal to the layer_id_plus1 values specified in the VPS extension data.

level_idc[i] signals information as specified in the current WD and the indicated values are values for all NAL units with a layer_id_plus1 equal to layer_id_plus1 values specified in the VPS extension data and a temporal_id equal to i.

num_reference_layers specifies the number of layers, identified by layer_id, to be used as references in the decoding process.

direct_coding_dependency_layer_id_plus1 indicates the layer_id_plus1 of NAL units to be used as references in the decoding process.

The embodiment just described is very similar to the one having been described with respect to FIGS. 4 to 6. Insofar, the same reference signs as before have been used in order to identify corresponding syntax elements in FIGS. 11 to 14. Insofar, the description of FIG. 7 is applicable to the new embodiment as well, wherein however differences are highlighted below.

In particular, in accordance with the embodiments of FIGS. 11 to 14 the operation point identifier 34 has been fixedly split-up into two components, namely a first component identifying the rank in a temporal scalability axis in the form of syntax element temporal_id 90, and a second component treating the rank or ranks according to the further scalability axis, with the second component being denoted 92. Insofar, the embodiment having been described with respect to FIGS. 11 to 14 corresponds to the previous embodiment except that it has the second component 92, which is further specified by the scalability axes descriptor.

A next difference pertains to the knowledge of the number of scalability axes. In the embodiment of FIGS. 4 to 6, an intermediate information in the form of the scenario syntax element 60 was provided in order to provide network entities with the opportunity to derive, solely based on the individual packet itself, where the operation point of this packet is, in an ordinary sense, positioned within the scalability space. In the present embodiment, a network entity is merely able to derive the following facts in case of the non-availability of a VPS NAL unit 42: 1) the position of the operation point of the current packet along the temporal axis using temporal_id 90. 2) If layer_id_plus1 is equal to 1, the operation point is at the lower most rank with respect to all other scalability axes except the temporal scalability axis.

As described hereinafter, all differences now highlighted may be applied individually and accordingly, if the syntax element temporal_id 90 is not used, a network entity may derive from the fact that layer_id_plus1 equals 1, that the operation point of the current packet denotes the base layer in accordance with all scalability axes.

In this regard, it should be noted that choosing layer_id_plus1 equaling 1 as denoting the lower most rank with respect to the other scalability axes except the temporal one, has merely been chosen as an example and may be varied, such as for example to layer_id_plus1 equaling 0.

A further difference to the above-outlined embodiment of FIGS. 4 to 6 relates to the scalability axes descriptor 38. One scalar valued syntax element 94, namely scalability_type, identifies the number of scalability axes (above the temporal one) and the corresponding meanings of these (additional) scalability axes, while for each of this indicated number of (additional) scalability axes, a syntax portion 96 reveals the partitioning of the fixed-length-syntax element 60 underlying component 92, field 56 and reference field 52 by sequentially assigning bits of this fixed-length-syntax element 60 the individual (additional) scalability axes.

A further difference relates to the VPS packets and the fact that same additionally comprise operation point identifier reference lists 98. For each field 56, such an operation point identifier reference list 98 identifies those operation point identifiers or those values of layer_id_plus 1, which form the necessitated basis for a reconstruction of the operation point which field 56 relates to. In other words, the operation point identifier reference list 98 identifies all operation points contained in a combination 24 (see FIG. 1b or 3) resulting from adding the data of packets of the operation point identified by field 56. It should be noted that for a certain field 56 the operation point identifier reference list 98 does not necessarily have to list all operation points included in the respective combination 24 of the operation point identified by field 56. Rather, it would suffice if the operation point identifier reference list lists one or more of reference operation points, the corresponding combinations 24 of which together result in the combination 24 of the operation point identified by the respective field 56.

In other words, in this aspect which is advantageous for its efficient coding of the level and/or profile constraints imposed onto the scalability layers, a data stream into which a media content is coded, comprises packets (c.p. NAL units), each packet comprising an packet type identifier nal_unit_type identifying a packet type associated with the respective packet, out of a plurality of packet types, wherein each packet having a packet type out of a first set of the plurality of packet types associated therewith (e.g. all NAL units), comprises an operation point identifier layer_id_plus1 identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith (e.g. non-VPS NAL units), additionally carries data contributing to a coded representation of the media content at the operation point associated with the respective packet along with the packets having any operation point associated therewith which precedes the operation point associated with the respective packet, or equals the operation point associated with the respective packet, wherein each packet (c.p. VPS NAL units) having a predetermined packet type disjoint to (i.e. external to) the second set associated therewith, has an scalability axes descriptor (c.p. scalability_type and layer_id_plus1_dim_len) defining the number of the one or more scalability axes and a semantic meaning thereof.

Another example of the data stream, wherein each of the packets having the predetermined packet type associated therewith, also comprises a sequence of profile and/or level descriptors vps_extension_data individually associated with at least a subset (e.g. the leading ones, in terms of the sequential operation point order) of the plurality of operation points, each profile and/or level descriptor defining an available coding option set (c.p. profile) and/or an available syntax element value range (c.p. level) which a syntax of packets having the operation point associated with the respective profile and/or level descriptor, associated therewith, obey, wherein a first set of the profile and/or level descriptors explicitly signal the definition of the available coding option set and/or available syntax element value range, (c.p. new_profile_level_flag=1) and a second, disjoint non-empty set of the profile and/or level descriptors signal the definition of the available coding option set and/or available syntax element value range by referencing another, preceding profile and/or level descriptor (c.p. new_profile_level_flag=0).

In another example of the data stream, the sequence of profile and/or level descriptors is sequentially associated, in the sequential operation point order, with the at least subset (e.g. the leading ones, in terms of the sequential operation point order) of the plurality of operation points.

In another example of the data stream, each profile and/or level descriptor has a field (c.p. layer_id_plus1) identifying the operation point the respective profile and/or level descriptor is associated with (i.e. along with 4), the sequential operation point order is derivable from the sequence of profile and/or level descriptors.

In another example of the data stream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the data stream, all operation point identifiers have a fixed-bit-length syntax element (c.p. layer_id_plus1), and the scalability access descriptor signals n max_dim and an association of n partitions layer_id_plus1_dim_len of the fixed-bit-length syntax element with the n scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order (with the second alternative being an alternative to above description).

According to a further aspect of the datastream, all operation point identifiers have a fixed-bit-length syntax element, and the scalability axes descriptor signals n and an association of n partitions of the fixed-bit-length syntax element with the n scalability axes so that the n-th portion is a ordinal measure of a position of the respective operation point along the n-th scalability axis.

According to another aspect, of the datastream, the scalability axes descriptor (c.p. scalability_type) comprises a syntax element the possible states of which are individually associated with different combinations of values for n and semantic meaning of the corresponding semantic meaning of the n scalability axes (i.e. a function maps {n,meaning(1), . . . , meaning(n)} to {1 . . . max. possible state of scalability_type}).

In another datastream into which a media content is coded, the datastream comprises packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein each packet having a predetermined packet type disjoint to (external to) the second set associated therewith, comprises a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a sequence of packets having the operation point associated with the respective profile and/or level descriptor, associated therewith, obey, wherein a first set of the profile and/or level descriptors explicitly signal the definition of the available coding option set and/or available syntax element value range, and a second, disjoint non-empty set of the profile and/or level descriptors signal the definition of the available coding option set and/or available syntax element value range by referencing another, preceding profile and/or level descriptor.

In another example of the datastream, the sequence of profile and/or level descriptors is sequentially associated, in the sequential operation point order, with the at least subset (e.g. the leading ones, in terms of the sequential operation point order) of the plurality of operation points.

In another example of the datastream, each profile and/or level descriptor has a field identifying the operation point the respective profile and/or level descriptor is associated with.

In another example of the datastream, in each profile and/or level descriptor, the field identifies the operation point the respective profile and/or level descriptor is associated with, using a bitsequence common to the operation point identifiers identifying the operation point the respective profile and/or level descriptor is associated with.

In another example of the datastream, all operation point identifiers have a fixed-bit-length syntax element and the scalability access descriptor signals n max_dim and an association of n partitions layer_id_plus1_dim_len) of the fixed-bit-length syntax element with then scalability axes, wherein the bitsequence is common to the fixed-bit-length syntax element.

In another example of the datastream, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the datastream, all operation point identifiers have a flag signaling as to whether same belongs to the first set of the profile and/or level descriptors explicitly signaling the definition of the available coding option set and/or available syntax element value range, and the second, disjoint non-empty set of the profile and/or level descriptors signaling the definition of the available coding option set and/or available syntax element value range by referencing another, preceding profile and/or level descriptor.

Another aspect may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or equals the operation point associated with the respective packet, wherein the network entity is configured to read from a packet having a predetermined packet type disjoint to (i.e. external to) the second set associated therewith, a scalability axes descriptor defining the number of the one or more scalability axes and a semantic meaning thereof, and interpret the operation point identifiers depending on the scalability axes descriptor.

In another example, the network entity is configured to read from the packet having the predetermined packet type disjoint to (external to) the second set associated therewith, a sequence of profile and/or level descriptors individually associated with at least a subset (e.g. the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example of the network entity, the sequence of profile and/or level descriptors is sequentially associated, in the sequential operation point order, with the at least subset (e.g. the leading ones, in terms of the sequential operation point order) of the plurality of operation points.

In another example of the network entity, each profile and/or level descriptor has a field identifying the operation point the respective profile and/or level descriptor is associated with.

In another example of the network entity, in each profile and/or level descriptor, the field identifies the operation point the respective profile and/or level descriptor is associated with, using a bitsequence common to the operation point identifiers identifying the operation point the respective profile and/or level descriptor is associated with.

In another example of the network entity, all operation point identifiers have a fixed-bit-length syntax element and the scalability access descriptor signals n max_dim and an association of n partitions layer_id_plus1_dim_len of the fixed-bit-length syntax element with then scalability axes, wherein the bitsequence is common to the fixed-bit-length syntax element.

In another example of the network entity, the second, disjoint non-empty set of the profile and/or level descriptors signal the definition of the available coding option set and/or available syntax element value range by referencing another, preceding profile and/or level descriptor using an explicit signaling of the field of the referenced profile and/or level descriptor, or using a relative pointer defined in units of ranking positions in the sequential operation point order.

In another example of the network entity, all operation point identifiers have a fixed-bit-length syntax element and the scalability access descriptor signals n max_dim and an association of n partitions layer_id_plus1_dim_len of the fixed-bit-length syntax element with the n scalability axes so that the n-th portion is a ordinal measure of a position of the respective operation point along the n-th scalability axis.

In another example, network entity is configured to render a selection among the packets having any packet type out of the first set of the plurality of packet types associated therewith based on the interpretation.

Another example may have a network entity (e.g., decoder or MANE) for processing a datastream into which a media content is coded, the datastream comprising packets, each packet comprising an packet type identifier identifying a packet type associated with the respective packet, out of a plurality of packet types, wherein each packet having a packet type out of a first set of the plurality of packet types associated therewith, comprises an operation point identifier identifying an operation point associated with the respective packet, out of a plurality of operation points within a scalability space spanned by a number n of scalability axes, with 0<n, the operation points having a sequential operation point order defined thereamong, wherein each packet having any packet type out of a second set of the first set of packet types associated therewith, additionally carries data contributing to a coded representation of the media content at the operation point associated with the respective packet along with the packets having any operation point associated therewith which precedes the operation point associated with the respective packet, or is equals the operation point associated with the respective packet, wherein the network entity is configured to read from a packet having a predetermined packet type disjoint to (external to) the second set associated therewith, a sequence of profile and/or level descriptors sequentially associated, in the sequential operation point order, with at least a subset (the leading ones, in terms of the sequential operation point order) of the plurality of operation points, each profile and/or level descriptor defining an available coding option set and/or an available syntax element value range which a syntax of packets having the operation point associated with the respective profile and/or level descriptor, associated therewith, obey, wherein the network entity is configure to, responsive to a signaling in the datastream, explicitly read from a first set of the profile and/or level descriptors the definition of the available coding option set and/or available syntax element value range, and read, for a second, disjoint non-empty set of the profile and/or level descriptors, a reference to another, preceding profile and/or level descriptor and derive the definition of the available coding option set and/or available syntax element value range of the second, disjoint non-empty set of the profile and/or level descriptors from the respective referenced preceding profile and/or level descriptor.

In another example, the network entity is configured to render a selection among the packets having any packet type out of the first set of the plurality of packet types associated therewith based on the associated available coding option set and/or an available syntax element value range.

The following deviations from above embodiments would be feasible. For example, instead of having one profile/level descriptor for exactly one operation point or layer ID, an grouping of the operation points or layer IDs into layer sets could be signaled in the data stream such as in the VPS, with associating each profile/level descriptor to a respective one of the sets. For example, a field of flags could be signaled to signal the grouping: for each set, one flag for each operation point could be present for signaling as to whether the respective operation point belongs to the respective set or not. Thus, rather than having field 56 citing any layer ID, the profile/level descriptor's filed 56 could index a set out of the signaled sets of layer IDs, i.e. out of the sets of operation points. Accordingly, the referencing of another profile/level descriptor would be done via signaling another layer set in field 52 rather than signaling an individual layer ID therein.

Further, with regard to the scalability axes descriptor 38, same could be signaled differently: a scalability type field composed of a sequence of flags, each associated with a certain scalability type, could by present in the data stream in the VPS, for example, and signal as to whether the respective scalability type is present or not. In the order the flags within this field, the flags being set would thus signal the number of scalability axes as well as the semantic meaning thereof. The subdivision of the layer ID field's 34 bit sequence into the fragments 62 could be done using a length indicator per scalability type, i.e. per flag set in the scalability_type field, just as done by layer_id_plus 1_dim_len. Together, scalability_type field and layer_id_plus1_dim_len would form the scalability axes descriptor 38.

Above, a pair of a list 98 of reference operation point identifiers and a field 56 identifying the operation point (or set of operation points) the list 98 of reference operation point identifiers is associated with, was used to indicate the sequential operation point order, i.e the dependency among the layers. This was one possibility to allow for operation points to depend on more than one predecessor of the operation points along their order of operation point identifiers. In a use case with multiple camera views, for example, signalling of multiple reference views (i.e. multiple values of nuh_layer_id) per coded view (i.e. an individual value of nuh_layer_id) is beneficial as occlusions and revelation of corresponding image areas in neighboring camera views may occur depending on the translation of cameras with respect to each other. Therefore, referencing multiple camera views can lead to a higher coding efficiency as revealed image areas (i.e. texture) may be predicted instead of intra-coded from either of the referenced camera views. Coding benefits are not limited to references within the same scalability dimension, e.g. a depth view (related to the currently coded camera view or another camera view) could be utilized to predict motion vectors for the currently coded dependent camera view. However, signaling which allows for one operation point to be dependent on more than one operation point having lower operation point identifier associated therewith, could also be implemented differently. For example, for each operation point, flags could signal as to which of the operation points preceding in layer ID, i.e. having a lower operation point identifier, the respective operation point depends on. The field could be signaled in a condensed form: the N operation points occurring in the bit stream have an order defined thereamong which is defined by their operation point identifier. The sequence of operation points may, thus, scanned from the second but lowest one in operation point identifier sense to the highest one, with inserting one flag per operation point with lower operation point identifier into the VPS, thereby needing $N(N-1)/2$ bits. That is, for each of the plurality of operation points—or at least a subset thereof-, a syntax, such as the reference layer ID list 98 or the sequence of flags concerning the operation point predecessors—identifying other operation points of the plurality of operation points, identified by lower operation point identifiers, may be present in the VPS, with these identified operation point identifiers forming the basis of the respective operation point: In other words, the syntax identifies those operation points, the respective operation point the syntax belongs to, is an extension of, thereby indicating the sequential operation point order.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Thomas Wiegand, Gary J. Sullivan, Gisle Bjontegaard, Ajay Luthra, "Overview of the H.264/AVC Video Coding Standard", IEEE Trans. Circuits Syst. Video Technol., vol. 13, N7, July 2003.

[2] JCT-VC, "High-Efficiency Video Coding (HEVC) text specification Working Draft 6", JCTVC-H1003, February 2012.

[3] ISO/IEC 13818-1: MPEG-2 Systems specification.

The invention claimed is:

1. An apparatus comprising:
a memory device; and
a processor comprising hardware configured to:
process a data stream including packets having encoded information related to a video, the packets including packets of first and second packet types out of a plurality of packet types, wherein each packet of the first packet type comprises (i) a fixed-bit-length syntax element identifying an operation point out of a plurality of operation points associated with the respective packet, and (ii) data, which when parsed by a decoder, contribute to reconstruction of at least a portion of the video at the operation point associated with the respective packet,
read, from a packet of the second packet type, a scalability descriptor including first information defining a total number n of a plurality of scalability types and second information, which when parsed by the decoder, indicates an association of n portions of the fixed-bit-length syntax element with the n scalability types, respectively,
interpret an operation point identifier for each packet of the first packet type in accordance with the scalability descriptor, and
decode the data of each packet of the first packet type based on the operation point identifier to reconstruct at least a portion of the video.

2. The apparatus of claim 1, wherein each operation point identifier further comprises a scenario syntax element, wherein the processor is configured to use the scenario syntax element to determine an association of n portions of the fixed-bit-length syntax element with the n scalability types so that the $n^{th}$ portion is an ordinal measure of a position of the respective operation point along the $n^{th}$ scalability type.

3. The apparatus of claim 1, wherein the processor is configured to render a selection of the packets of the first packet type.

4. The apparatus of claim 1, wherein the processor is configured to read, from the packet of the second packet type, a sequence of profile or level descriptors individually associated with at least a subset of the plurality of operation points, each profile or level descriptor defining an available coding option set or an available syntax element value range which a syntax of packets having the operation point associated with the respective profile or level descriptor, associated therewith, obey,
wherein the processor is configured to,
responsive to a signaling in the data stream, read from a first set of the profile or level descriptors the definition of the available coding option set or available syntax element value range, and
read, for a second, disjoint non-empty set of the profile or level descriptors, a reference to another, profile or level descriptor and derive the definition of the available coding option set or available syntax element value range of the second, disjoint non-empty set of the profile or level descriptors from the respective referenced profile or level descriptor.

5. The apparatus of claim 4, wherein each profile or level descriptor comprises a field identifying the operation point the respective profile or level descriptor is associated with.

6. The apparatus of claim 5, wherein the second, disjoint non-empty set of the profile or level descriptors signal the definition of the available coding option set or available syntax element value range by referencing another profile or level descriptor using an explicit signaling of the field of the referenced profile or level descriptor.

7. The apparatus of claim 4, wherein the processor is configure to read, from the packets of the second packet type, also, for each of at least a subset of the plurality of operation points, a syntax identifying other operation points of the plurality of operation points, identified by lower operation point identifiers, which the respective operation point is an extension of, thereby indicating the sequential operation point order.

8. The apparatus of claim 7, wherein each field identifies the respective operation point using a bit-sequence common to the operation point identifiers identifying the respective operation point.

9. The apparatus of claim 8, wherein each operation point identifier further comprises a scenario syntax element, the scenario syntax element signaling an association of n portions of the fixed-bit-length syntax element with the n scalability types, wherein the bit-sequence is common to the fixed-bit-length syntax element.

10. A method for decoding a video, comprising:
processing a data stream including packets having encoded information related to a video, the packets including packets of first and second packet types out of a plurality of packet types, wherein each packet of the first packet type comprises (i) a fixed-bit-length syntax element identifying an operation point out of a plurality of operation points associated with the respective packet, and (ii) data, which when parsed by a decoder, contribute to reconstruction of at least a portion of the video at the operation point associated with the respective packet;
reading, from a packet of the second packet type, a scalability descriptor including first information defining a total number n of a plurality of scalability types and second information, which when parsed by the decoder, indicates an association of n portions of the fixed-bit-length syntax element with the n scalability types, respectively;
interpreting an operation point identifier for each packet of the first packet type in accordance with the scalability descriptor; and
decoding the data of each packet of the first packet type based on the operation point identifier to reconstruct at least a portion of the video.

11. The method of claim 10, wherein each operation point identifier further comprises a scenario syntax element, wherein the method comprises using the scenario syntax element to determine an association of n portions of the fixed-bit-length syntax element with the n scalability types so that the $n^{th}$ portion is an ordinal measure of a position of the respective operation point along the $n^{th}$ scalability type.

12. The method of claim 10, further comprising rendering a selection of the packets of the first packet type.

13. The method of claim 10, further comprising
reading, from the packet of the second packet type, a sequence of profile or level descriptors individually associated with at least a subset of the plurality of operation points, each profile or level descriptor defining an available coding option set or an available syntax element value range which a syntax of packets having the operation point associated with the respective profile or level descriptor, associated therewith, obey;
responsive to a signaling in the data stream, reading from a first set of the profile or level descriptors the definition of the available coding option set or available syntax element value range; and
reading, for a second, disjoint non-empty set of the profile or level descriptors, a reference to another, profile or level descriptor and derive the definition of the available coding option set or available syntax element value range of the second, disjoint non-empty set of the profile or level descriptors from the respective referenced profile or level descriptor.

14. The method of claim 13, wherein each profile or level descriptor comprises a field identifying the operation point the respective profile or level descriptor is associated with.

15. The method of claim 14, wherein the second, disjoint non-empty set of the profile or level descriptors signal the definition of the available coding option set or available syntax element value range by referencing another profile or level descriptor using an explicit signaling of the field of the referenced profile or level descriptor.

16. The method of claim 13, wherein the processor is configure to read, from the packets of the second packet type, also, for each of at least a subset of the plurality of operation points, a syntax identifying other operation points of the plurality of operation points, identified by lower operation point identifiers, which the respective operation point is an extension of, thereby indicating the sequential operation point order.

17. The method of claim 16, wherein each field identifies the respective operation point using a bit-sequence common to the operation point identifiers identifying the respective operation point.

18. The method of claim 17, wherein each operation point identifier further comprises a scenario syntax element, the scenario syntax element signaling an association of n portions of the fixed-bit-length syntax element with the n scalability types, wherein the bit-sequence is common to the fixed-bit-length syntax element.

19. A non-transitory computer-readable medium for storing data associated with a video, comprising:
a data stream stored in the non-transitory computer-readable medium, the data stream including packets having encoded information related to the video, the packets including packets of first and second packet types out of a plurality of packet types, wherein each packet of the first packet type comprises (i) a fixed-bit-length syntax element identifying an operation point out of a plurality of operation points associated with the respective packet, and (ii) data, which when parsed by a decoder, contribute to reconstruction of at least a portion of the video at the operation point associated with the respective packet, and
wherein each packet of the second packet type comprises a scalability descriptor including first information defining a total number n of a plurality of scalability types and second information, which when parsed by the decoder, indicates an association of n portions of the fixed-bit-length syntax element with the n scalability types, respectively.

20. The computer-readable medium of claim 19, wherein each operation point identifier further comprises a scenario syntax element, the scenario syntax element signaling an association of n portions of the fixed-bit-length syntax element with the n scalability types so that the $n^{th}$ portion is an ordinal measure of a position of the respective operation point along the $n^{th}$ scalability type.

21. The computer-readable medium of claim 19, wherein the scalability descriptor comprises a syntax element the possible states of which are individually associated with different combinations of values for n and a corresponding semantic meaning of the n scalability types.

22. The computer-readable medium of claim 19, wherein each packet of the second packet type comprises a sequence of profile or level descriptors associated with one or more of at least a subset of the plurality of operation points, each profile or level descriptor defining an available coding option set or an available syntax element value range which a syntax of packets having an operation point associated with the respective profile or level descriptor, associated therewith, obey,
wherein a first set of the profile or level descriptors explicitly signal the definition of the available coding option set or available syntax element value range, and a second, disjoint non-empty set of the profile or level descriptors signal the definition of the available coding option set or available syntax element value range by referencing another profile or level descriptor.

23. The computer-readable medium of claim 22, wherein each profile or level descriptor comprises a field identifying the operation point the respective profile or level descriptor is associated with.

24. The computer-readable medium of claim 23, wherein the second, disjoint non-empty set of the profile or level descriptors signal the definition of the available coding option set or available syntax element value range by referencing another profile or level descriptor using an explicit signaling of the field of the referenced profile or level descriptor.

25. The computer-readable medium of claim 19, wherein each packet of the second packet type comprises, for each of at least a subset of the plurality of operation points, a syntax identifying other operation points of the plurality of operation points, identified by lower operation point identifiers, which the respective operation point is an extension of, thereby indicating the sequential operation point order.

26. The computer-readable medium of claim 23, wherein each field identifies the respective operation point using a bit-sequence common to the operation point identifiers identifying the respective operation point.

27. The computer-readable medium of claim 26, wherein each operation point identifier further comprises a scenario syntax element, the scenario syntax element signaling an association of n portions of the fixed-bit-length syntax element with the n scalability types, wherein the bit-sequence is common to the fixed-bit-length syntax element.

28. An encoder comprising:
a memory device; and
a processor comprising hardware configured to:
encode, into a data stream, packets having information related to a video, the packets including packets of first and second packet types out of a plurality of packet types, wherein each packet of the first packet type comprises (i) a fixed-bit-length syntax element identifying an operation point out of a plurality of operation points associated with the respective packet, and (ii) data, which when parsed by a decoder, contribute to reconstruction of at least a portion of the video at the operation point associated with the respective packet,
wherein each packet of the second packet type comprises a scalability descriptor including first information defining a total number n of a plurality of scalability types and second information indicates an association of n portions of the fixed-bit-length syntax element with the n scalability types, respectively.

29. The encoder of claim 28, wherein each operation point identifier further comprises a scenario syntax element, wherein the processor is configured to use the scenario syntax element to determine an association of n portions of the fixed-bit-length syntax element with the n scalability types so that the $n^{th}$ portion is an ordinal measure of a position of the respective operation point along the $n^{th}$ scalability type.

30. The encoder of claim 28, wherein the processor is configured to encoder, into the packet of the second packet type, a sequence of profile or level descriptors individually associated with at least a subset of the plurality of operation points, each profile or level descriptor defining an available coding option set or an available syntax element value range which a syntax of packets having the operation point associated with the respective profile or level descriptor, associated therewith, obey.

* * * * *